United States Patent
Koishi

(10) Patent No.: US 8,270,712 B2
(45) Date of Patent: Sep. 18, 2012

(54) IMAGE PROCESSING DEVICE, IMAGE PROCESSING PROGRAM, AND IMAGE PROCESSING METHOD

(75) Inventor: Erika Koishi, Yokohama (JP)

(73) Assignee: Nikon Corporation, Tokyo (JP)

( * ) Notice: Subject to any disclaimer, the term of this patent is extended or adjusted under 35 U.S.C. 154(b) by 1259 days.

(21) Appl. No.: 11/988,549

(22) PCT Filed: Jul. 12, 2006

(86) PCT No.: PCT/JP2006/313887
§ 371 (c)(1),
(2), (4) Date: Feb. 8, 2008

(87) PCT Pub. No.: WO2007/007798
PCT Pub. Date: Jan. 18, 2007

(65) Prior Publication Data
US 2009/0010535 A1    Jan. 8, 2009

(30) Foreign Application Priority Data

Jul. 12, 2005 (JP) ................................. 2005-202823

(51) Int. Cl.
 *G06K 9/00* (2006.01)
(52) U.S. Cl. .......................... 382/167; 382/162; 382/165
(58) Field of Classification Search .................. 382/118, 382/165, 167, 162, 239, 286; 375/240.03; 348/453, 223.1; 345/589, 590, 591, 593, 345/597, 601, 603, 604
See application file for complete search history.

(56) References Cited

U.S. PATENT DOCUMENTS 6,229,916 B1    5/2001    Ohkubo
(Continued)

FOREIGN PATENT DOCUMENTS

EP    0 993 180 A1    4/2000
(Continued)

OTHER PUBLICATIONS

European Office Action issued in European Application No. 06 768 151.0 dated Dec. 16, 2011.

(Continued)

*Primary Examiner* — Ali Bayat
(74) *Attorney, Agent, or Firm* — Oliff & Berridge, PLC

(57) ABSTRACT

An image processing device that transforms first image data of an image captured under an image-capturing condition into second image data that reproduce a color appearance under a viewing condition, includes: an image data acquiring unit that acquires the first image data of the image captured under the image-capturing condition; a first transformation unit that transforms the acquired first image data into the second image data pixel by pixel based on the image-capturing condition and the viewing condition by a first method that takes into consideration chromatic adaptation; a second transformation unit that transforms the acquired first image data into the second image data pixel by pixel based on the image-capturing condition and the viewing condition by a second method that is simpler than the first method and takes into consideration chromatic adaptation; and a controlling unit that controls such that either the first transformation unit or the second transformation unit is selected depending on a state of a transformation target pixel or a neighborhood pixel neighboring the transformation target pixel in the first image data.

18 Claims, 20 Drawing Sheets

U.S. PATENT DOCUMENTS

| | | | |
|---|---|---|---|
| 6,504,952 B1 | 1/2003 | Takemura et al. | |
| 2002/0085752 A1 | 7/2002 | Ohga | |
| 2003/0043166 A1 | 3/2003 | Kumada et al. | |
| 2003/0184779 A1 | 10/2003 | Ohga | |
| 2005/0052671 A1* | 3/2005 | Nishikawa | 358/1.9 |
| 2006/0002611 A1* | 1/2006 | Mantiuk et al. | 382/239 |
| 2008/0025601 A1* | 1/2008 | Ohga | 382/167 |
| 2010/0245387 A1* | 9/2010 | Bachelder et al. | 345/633 |

FOREIGN PATENT DOCUMENTS

| | | |
|---|---|---|
| EP | 1 085 749 A2 | 3/2001 |
| JP | A-2001-320591 | 11/2001 |
| JP | A-2002-077652 | 3/2002 |
| JP | A-2003-069838 | 3/2003 |
| JP | A-2003-256823 | 9/2003 |

OTHER PUBLICATIONS

Hirohisa Yaguchi; Color Appearance Model-Outline of CIEMCAM02-, Color Forum Japan 2003; pp. 57-62; 2003.

Nathan Moroney et al.; The CIECAM02 Color Appearance Model; IS&T/SID Tenth Color Imaging Conference 2002; pp. 23-27; 2002.

A Colour Appearance Model for Colour Management Systems: CIECAM02; CIE Technical Report; pp. I-II; 2004.

Süsstrunk et al., "Chromatic Adaptation Performance of Different RGB Sensors", *IS&T/SPIE Electronic Imaging*, Jan. 2001, pp. 1-12, SPIE vol. 4300, retrieved from http://www.scarse.org/docs/papers/shf01.pdf on Nov. 12, 2009.

Extended European Search Report issued in European Patent Application No. 06768151.0 on Dec. 2, 2009.

\* cited by examiner

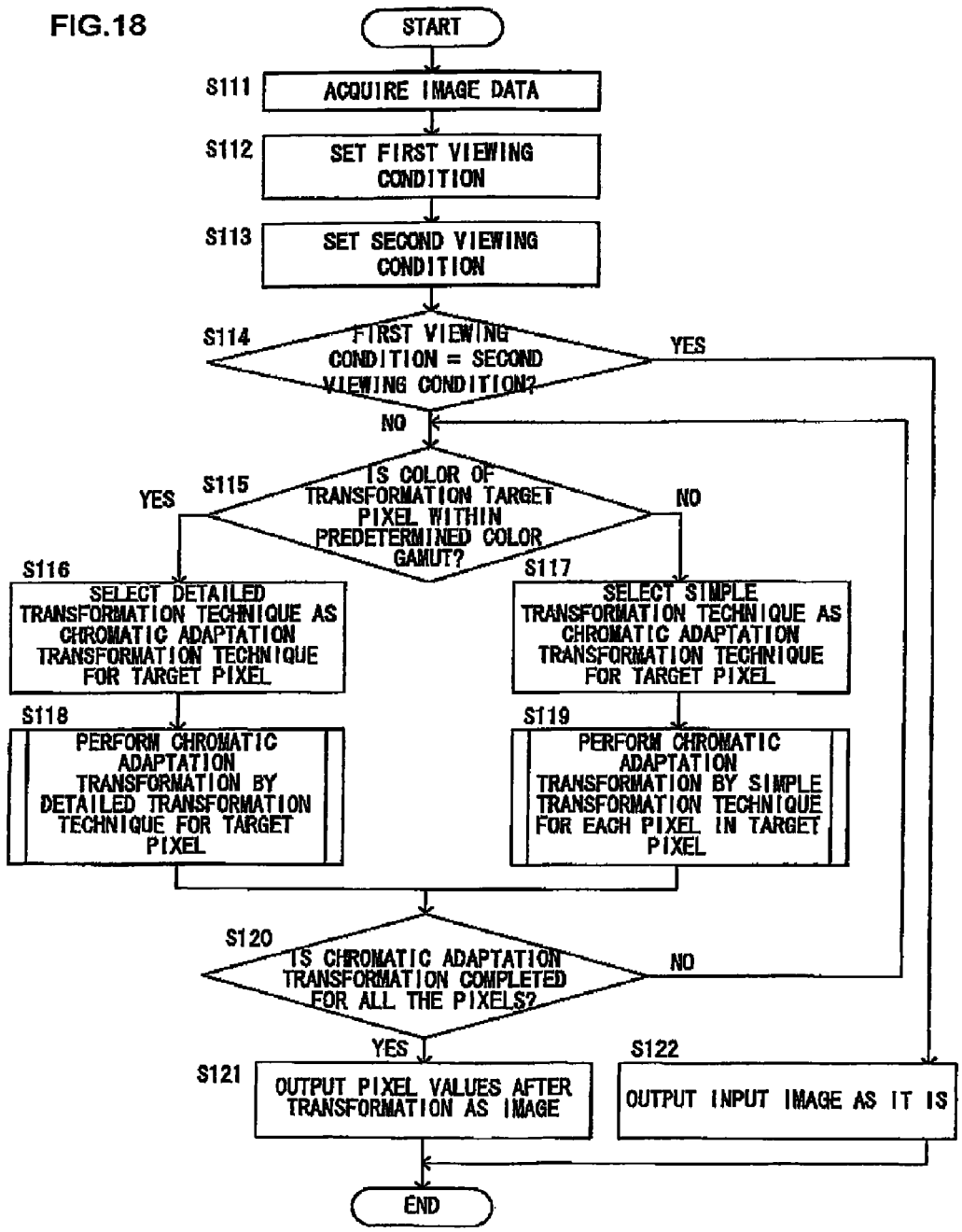

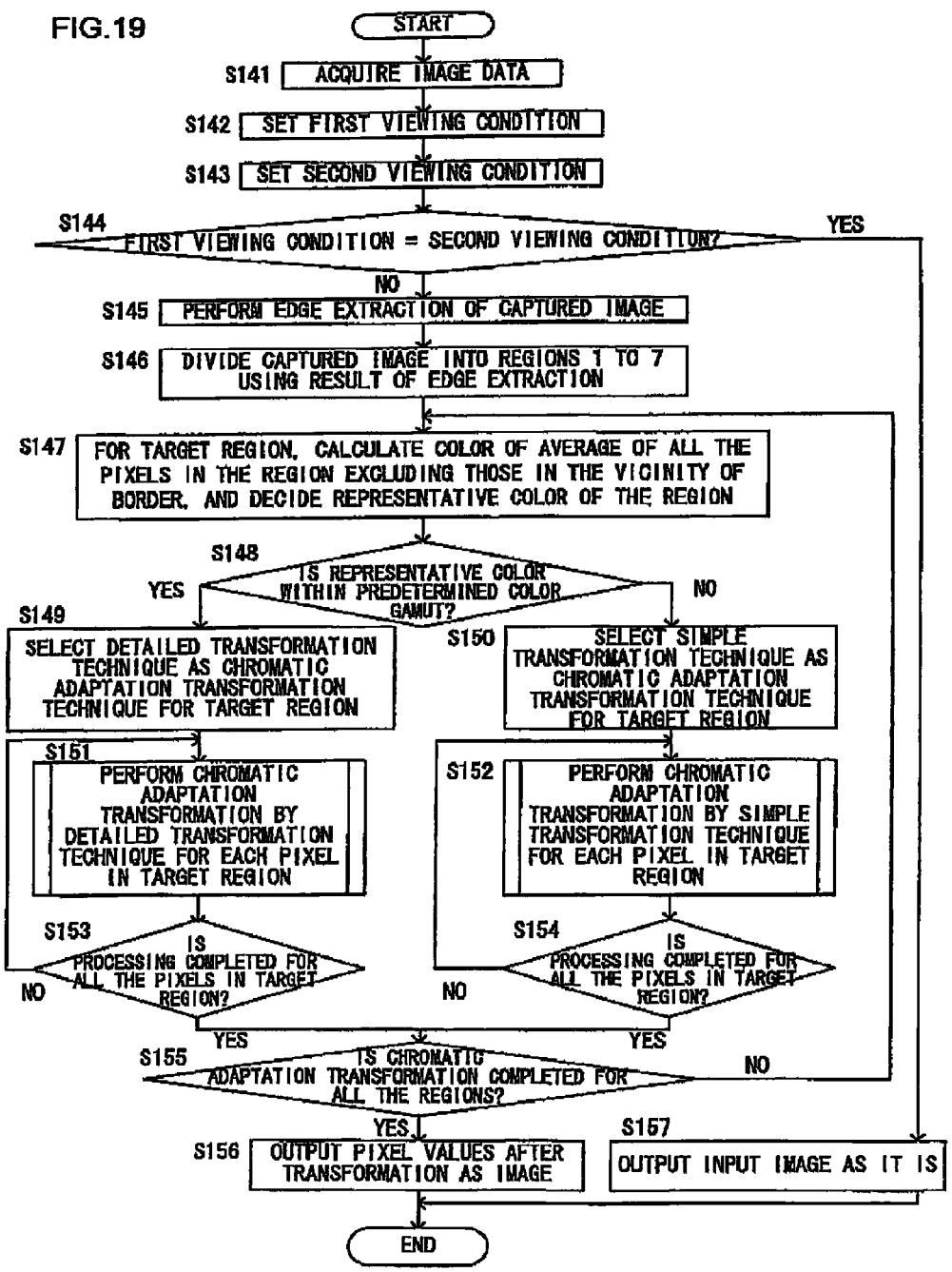

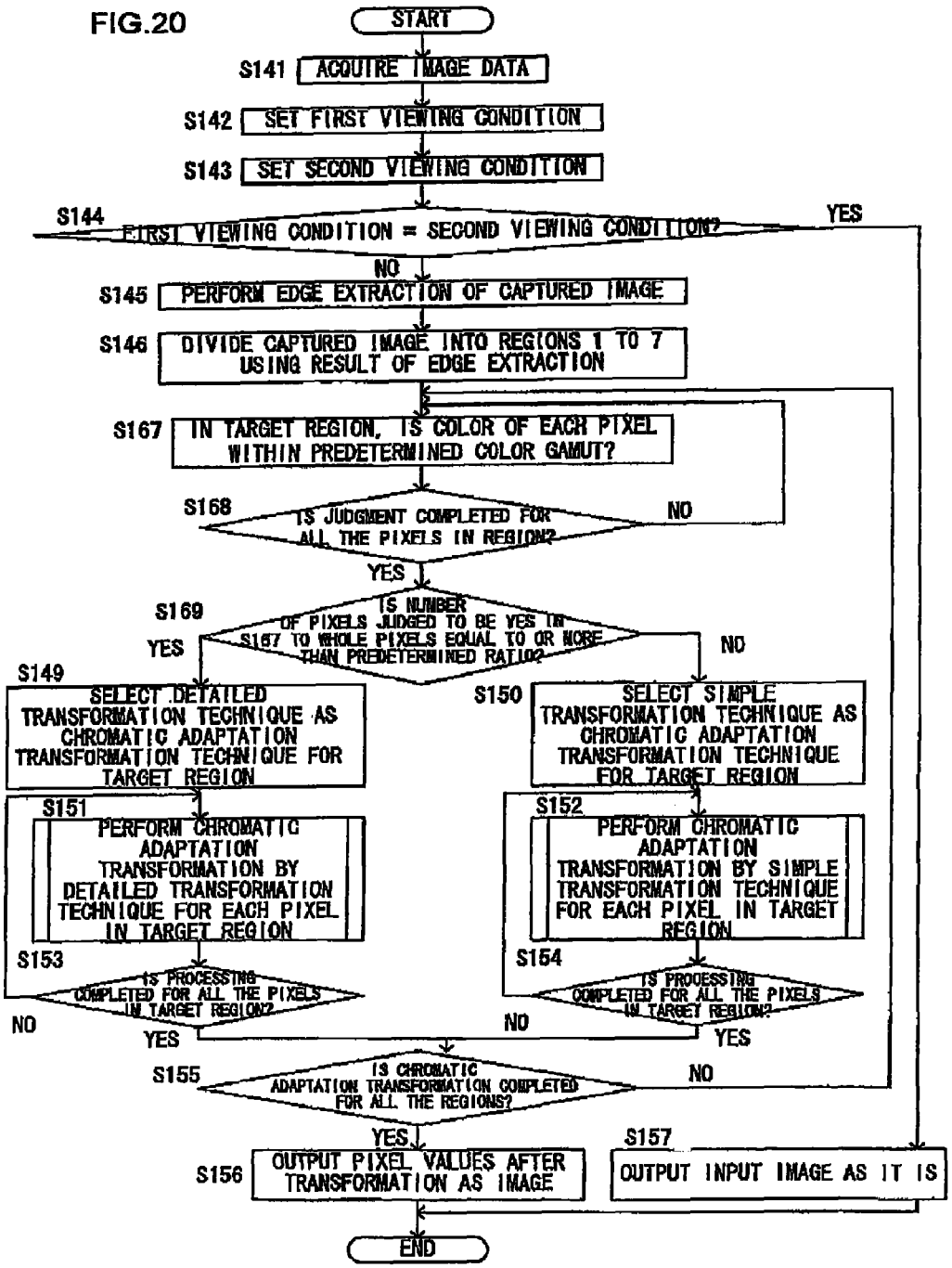

IMAGE PROCESSING DEVICE, IMAGE PROCESSING PROGRAM, AND IMAGE PROCESSING METHOD

TECHNICAL FILED

The present invention relates to an image processing device, an image processing program, and an image processing method for transforming image data of an image captured under some image-capturing conditions into image data that reproduce a color appearance under some other viewing conditions.

BACKGROUND ART

Various types of color appearance models have been proposed that convert images captured under some image-capturing conditions to the corresponding color appearances under some other viewing conditions taking into consideration chromatic adaptation properties of human vision. An example of such models is a color appearance model called CIECAM02 proposed in 2002 by CIE (International Commission on Illumination) (see Non-Patent Document 1). The CIECAM02 color appearance model takes into consideration influences of a difference in white point of illumination, a difference in device luminance, a ratio of a device white luminance to a surround white luminance, a difference in a background luminance and so on.

Non-Patent Document 1: Hirohisa Yaguchi, "Color Appearance Model—Outline of CIEMCAM02", Color Forum JAPAN 2003, 2003, p. 57-62.

DISCLOSURE OF THE INVENTION

Problem to be Solved by the Invention

However, the color appearance model of CIECAM02 involves a very complicated transformation, many parameters are necessary and many calculation steps are required before color appearance prediction under some viewing conditions can be obtained. The calculation itself uses not only the four basic operations of arithmetic but also exponentiation operations frequently. Further, if the color appearance model such as one described above is applied to the whole image, the above-mentioned transformation must be performed for each pixel, which causes a problem that the processing will be under a considerable load. In particular, to determine a background luminance, which is one of input parameters, for each pixel, calculation of the parameter, such as calculation of an average luminance of all the pixels in the field of view of 10 degrees surrounding the each pixel, is needed. This also makes the load heavier.

Means for Solving the Problem

According to the 1st aspect of the present invention, an image processing device that transforms first image data of an image captured under an image-capturing condition into second image data that reproduce a color appearance under a viewing condition, comprises: an image data acquiring unit that acquires the first image data of the image captured under the image-capturing condition; a first transformation unit that transforms the acquired first image data into the second image data pixel by pixel based on the image-capturing condition and the viewing condition by a first method that takes into consideration chromatic adaptation; a second transformation unit that transforms the acquired first image data into the second image data pixel by pixel based on the image-capturing condition and the viewing condition by a second method that is simpler than the first method and takes into consideration chromatic adaptation; and a controlling unit that controls such that either the first transformation unit or the second transformation unit is selected depending on a state of a transformation target pixel or a neighborhood pixel neighboring the transformation target pixel in the first image data.

According to the 2nd aspect of the present invention, in the image processing device according to the 1st aspect, it is preferred that the controlling unit controls such that when a color of the transformation target pixel in the first image data is within a predetermined color gamut, the first transformation unit is selected, and when the color of the transformation target pixel in the first image data is not within the predetermined color gamut, the second color transformation unit is selected.

According to the 3rd aspect of the present invention, in the image processing device according to the 2nd aspect, it is preferred that the predetermined color gamut includes a predetermined range of luminance or a predetermined range of hue.

According to the 4th aspect of the present invention, in the image processing device according to the 2nd or 3rd aspect, it is preferred that: the image processing device further comprises a color gamut defining unit that in case that many persons select a specified color different from an original color as a corresponding color achieving a corresponding color appearance with the original color under an influence of at least one of a background luminance surrounding a transformation target pixel in the image and a difference between the image-capturing condition and the viewing condition, defines a group of such original colors as the predetermined color gamut; and the controlling unit, referring to the color gamut defining unit, judges whether or not a color of a transformation target pixel in the first image data is within the predetermined color gamut.

According to the 5th aspect of the present invention, in the image processing device according to the 1st aspect, it is preferred that the controlling unit controls such that the first image data are divided into a plurality of regions and any one of the first transformation unit and the second unit is selected region by region depending on a state of pixels included in each divided region so that the same transformation unit is selected for each pixel in the same region.

According to the 6th aspect of the present invention, in the image processing device according to the 5th aspect, it is preferred that the controlling unit controls such that when for pixels included in a transformation target region in the first image data, a ratio of a number of pixels whose color is in a predetermined color gamut to a number of all the pixels is equal to or more than a predetermined ratio, the first transformation unit is selected, and when the ratio of the number of pixels whose color is in the predetermined color gamut to the number of all the pixels is less than the predetermined ratio, the second transformation unit is selected.

According to the 7th aspect of the present invention, in the image processing device according to the 6th aspect, it is preferred that the predetermined color gamut includes a predetermined range of luminance and a predetermined range of hue.

According to the 8th aspect of the present invention, in the image processing device according to the 6th or 7th aspect, it is preferred that: the image processing device further comprises a color gamut defining unit that in case that many persons select a specified color different from an original color as a corresponding color achieving a corresponding color appearance with the original color under an influence of at least one of a background luminance surrounding a transformation target pixel in the image and a difference between the image-capturing condition and the viewing condition, defines a group of such original colors as the predetermined color gamut; and the controlling unit, referring to the color gamut defining unit, judges whether or not a color of each pixel included in a transformation target region in the first image data is within the predetermined color gamut.

According to the 9th aspect of the present invention, in the image processing device according to the 5th aspect, it is preferred that the controlling unit controls such that when a color representing a transformation target region in the first image data is within the predetermined color gamut, the first transformation unit is selected, and when the color representing the transformation target region in the first image data is not within the predetermined color gamut, the second color transformation unit is selected.

According to the 10th aspect of the present invention, in the image processing device according to the 9th aspect, it is preferred that the predetermined color gamut includes a predetermined range of luminance or a predetermined range of hue.

According to the 11th aspect of the present invention, in the image processing device according to the 9th or 10th aspect, it is preferred that: the image processing device further comprises a color gamut defining unit that in case that many persons select a specified color different from an original color as a corresponding color achieving a corresponding color appearance with the original color under an influence of at least one of a background luminance surrounding a transformation target pixel in the image and a difference between the image-capturing condition and the viewing condition, defines a group of such original colors as the predetermined color gamut; and the controlling unit, referring to the color gamut defining unit, judges whether or not the color representing the transformation target region in the first image data is within the predetermined color gamut.

According to the 12th aspect of the present invention, in the image processing device according to any one of the 9th to 11th aspects, it is preferred that the color representing the transformation target region is a color obtained by averaging colors of all or a predetermined number or more of pixels included in the transformation target region.

According to the 13th aspect of the present invention, in the image processing device according to any one of the 1st to 12th aspects, it is preferred that both the first method and the second method are methods based on the same color appearance model, and the second method is obtained by omitting a predetermined calculation from the color appearance model.

According to the 14th aspect of the present invention, in the image processing device according to any one of the 1st to 12th aspects, it is preferred that the second method is a method that involves only four basic operations of arithmetic.

According to the 15th aspect of the present invention, in the image processing device according to any one of the 1st to 12th aspects, it is preferred that: both the first method and the second method are methods that perform a transformation taking into consideration a background luminance of the transformation target pixel; the first method calculates the background luminance of the transformation target pixel based on a luminance of a neighboring pixel; and the second method sets the background luminance of the transformation target pixel to a predetermined fixed value.

According to the 16th aspect of the present invention, in the image processing device according to the 13th or 15th aspect, it is preferred that the first method and the second method are each a method using a color appearance model according to CIECAM02.

According to the 17th aspect of the present invention, in the image processing device according to any one of the 1st to 12th, and 14th aspects, it is preferred that the first method is a method using a color appearance model according to CIECAM02 and the second method is a method using a von Kries adaptation transformation formula.

According to the 18th aspect of the present invention, an image processing device that transforms first image data prepared based on a first viewing condition into second image data that reproduce a color appearance under a second viewing condition that is different from the first viewing condition, comprises: an image data acquiring unit that acquires the first image data prepared based on the first viewing condition; a first transformation unit that transforms the acquired first image data into the second image data pixel by pixel based on the first viewing condition and the second viewing condition by a first method that takes into consideration chromatic adaptation; a second transformation unit that transforms the acquired first image data into the second image data pixel by pixel based on the viewing condition and the second viewing condition by a second method that is simpler than the first method and takes into consideration chromatic adaptation; and a controlling unit that controls such that either the first transformation unit or the second transformation unit is selected depending on a state of a transformation target pixel or a neighborhood pixel neighboring the transformation target pixel in the first image data.

According to the 19th aspect of the present invention, an image processing program causes a computer to realize a function of the image processing device according to any one of the 1st to 18th aspects.

According to the 20th aspect of the present invention, an image processing method that transforms first image data of an image captured under an image-capturing condition into second image data that reproduce a color appearance under a viewing condition, comprises: acquiring the first image data of the image captured under the image-capturing condition; and when the acquired first image data are transformed into the second image data pixel by pixel based on the image-capturing condition and the viewing condition, using selectively either one of a first method that takes into consideration chromatic adaptation and a second method that takes into consideration chromatic adaptation simpler than the first method depending on a state of a transformation target pixel or a neighborhood pixel neighboring the transformation target pixel in the first image data.

According to the 21st aspect of the present invention, in the image processing method according to the 20th aspect, it is preferred that: the image processing method further comprises dividing the first image data into a plurality of regions; and when the acquired first image data are transformed into the second image data pixel by pixel based on the image-capturing condition and the viewing condition, either one of the first method that takes into consideration chromatic adaptation and the second method that takes into consideration chromatic adaptation simpler than the first method is used selectively region by region depending on a state of pixels included in each of the regions.

According to the 22nd aspect of the present invention, an image processing method that transforms first image data prepared based on a first viewing condition into second image data that reproduce a color appearance under a second viewing condition that is different from the first viewing condition, comprises: acquiring the first image data of the image captured under the first viewing condition; and when the acquired first image data are transformed into the second image data pixel by pixel based on the first viewing condition and the second viewing condition, using selectively either one of a first method that takes into consideration chromatic adaptation and a second method that takes into consideration chromatic adaptation simpler than the first method depending on a state of a transformation target pixel or a neighborhood pixel neighboring the transformation target pixel in the first image data.

Advantageous Effect of the Invention

According to the present invention, which is configured as explained above, the load on the processing can be decreased without deteriorating the effect of reproducing accurate color appearance when transforming image data of an image captured under some image-capturing conditions into image data that enables reproduction of a color appearance under some other viewing conditions.

BRIEF DESCRIPTION OF THE DRAWINGS

FIG. 18 is a flowchart illustrating processing in the sixth embodiment;

FIG. 19 is a flowchart illustrating processing in a variation example in the sixth embodiment of the present invention;

FIG. 20 is a flowchart illustrating processing in the variation example of the sixth embodiment.

BEST MODE FOR CARRYING OUT THE INVENTION

First Embodiment

Figure 1:
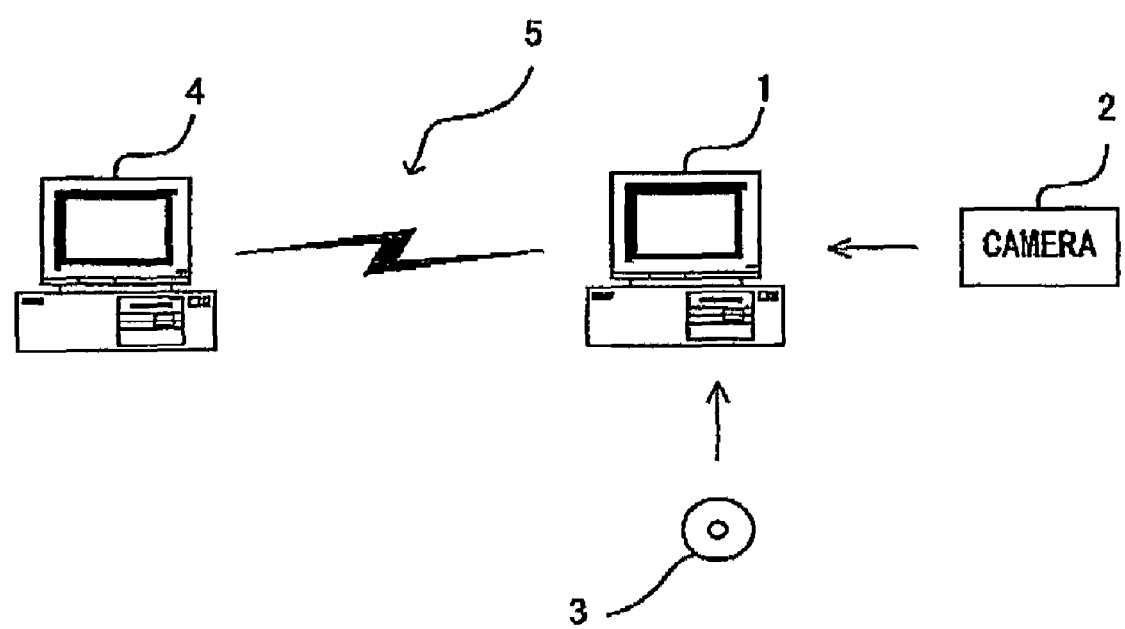
FIG. 1 is a diagram showing an image processing device according to one embodiment of the present invention.

FIG. 1 is a diagram showing an image processing device according to one embodiment of the present invention. An image processing device is realized by a personal computer 1. The personal computer 1 is connected with a digital camera 2, a recording medium 3 such as a CD-ROM, another computer 4 and so on and provided with various types of image data therefrom. The personal computer 1 performs image processing detailed hereinbelow on the provided image data. The computer 4 is connected with the computer 1 through an electric communication line 5 such as the Internet or the like.

The program to be implemented by the personal computer 1 for image processing is, similarly to the construction shown in FIG. 1, provided from a recording medium such as a CD-ROM or another computer through an electric communication line such as the Internet or the like and installed in the personal computer 1. The personal computer 1 is constituted by a CPU (not shown) and its peripheral circuits (not shown) and the CPU executes the installed program.

When a program is provided through the electric communication line such as the Internet or the like, the program is converted into signals on a carrier wave that is carried in the electric communication line, i.e. a transmission medium, before it can be transmitted. In this manner, the program is provided as a computer-readable computer program product in various forms such as a recording medium or a carrier wave.

Figure 2:
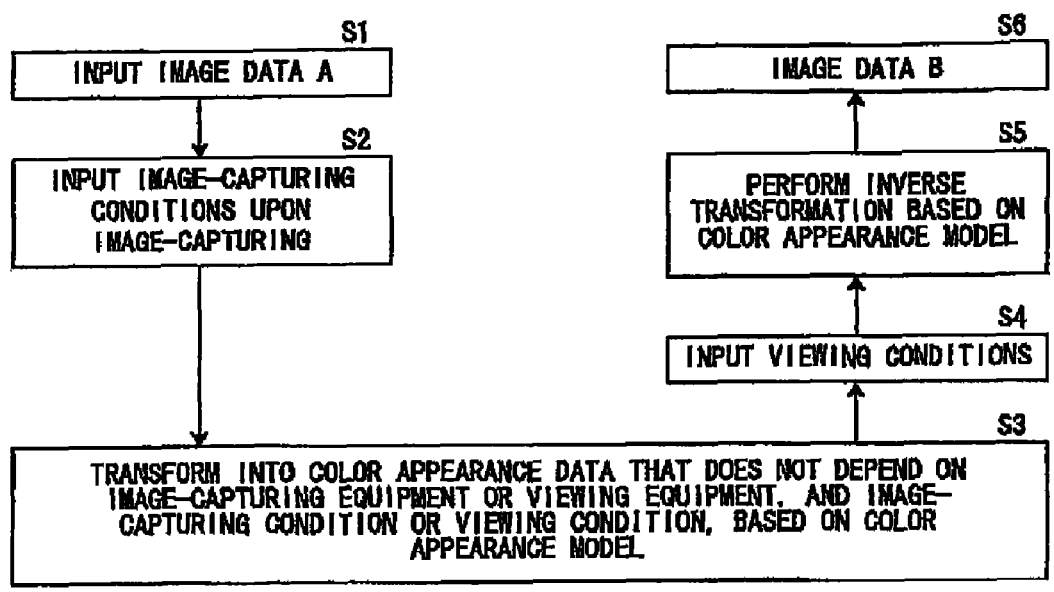
FIG. 2 is a diagram illustrating a basic flow of processing that is performed by a personal computer 1.

The personal computer 1 according to the present embodiment transforms image data of an image captured under some image-capturing conditions into image data that reproduces a color appearance under some other view conditions which are different in illumination conditions from the image-capturing conditions taking into consideration chromatic adaptation properties of human vision. This transformation is referred to as chromatic adaptation transformation. FIG. 2 is a diagram illustrating a basic flow of processing performed by the personal computer 1.

In a step 1, image data A of an image captured by, for example, a digital camera are acquired. In the present embodiment, it is assumed that the image data A are expressed in a CIE 1931 XYZ color system. Also, the image data A referred to herein present a color influenced by the color of the light source and perceived by vision as influenced by image-capturing conditions such as the luminance of the light source and the luminance of the surrounding. In a step S2, the image-capturing conditions upon the image-capturing in which the image corresponding to the image data A is captured are input. The image-capturing conditions upon the image-capturing may be data attached to the image data A or data input from a keyboard of the personal computer 1 optionally.

In a step S3, a predetermined color appearance model is used to transform the image data A into data of a color appearance that does not depend either on the image-capturing conditions or on the viewing conditions. On this occasion, the image-capturing conditions upon the image-capturing input in the step S2 are used as the input parameter of the color appearance model in the step S3. The data obtained by transformation are expressed as color appearance data that depends none of the image-capturing equipment, the viewing equipment, the image-capturing conditions, and the viewing conditions.

In a step S4, viewing conditions of a viewing environment that is desired to be reproduced are selectively input by operation by a user (viewer) at the keyboard of the personal computer 1. Alternatively, for example, an sRGS standard viewing environment may be assumed and stored in advance as a standard viewing condition, which may be used as a viewing condition. In a step S5, the same color appearance model as that in the step S3 is applied to the color appearance data that depends none of the image-capturing conditions and the viewing conditions acquired in the step S3. However, a transformation reverse to that in the step S3 is performed. On this occasion, the viewing conditions input in the step S4 are used as input parameters for the color appearance data in the step S5. Then, in a step S6, image data B which reproduces a color appearance depending on the viewing conditions are acquired. The image data B are image data expressed in a CIE 1931 XYZ color system.

The above-mentioned image-capturing conditions are those conditions that relate to an illumination of a scene upon image-capturing. The viewing conditions are those conditions that relate to an illumination of equipment used for viewing an image or surrounding viewing environment. The image-capturing conditions and the viewing conditions are those conditions that relate to an environment of a visual field and its surrounding that affect appearance, such as a luminance and a white point of a source of illumination, brightness of the surrounding, and so on, that is, a viewing environment.

The present invention is featured by the color appearance model applied in the step S3 and the step S5. The color appearance model of CIECAM02, as described above, is an excellent color appearance model that reproduces a color appearance with high precision taking into consideration influences of a difference in a white point of an source of illumination, a difference in a device luminance, a ratio of a device luminance to a surround luminance (a peripheral luminance), a difference in a background luminance and so on and also taking into consideration chromatic adaptation properties of human vision. However, a problem may occur that a load of processing is heavy.

Accordingly, in the present embodiment, the color appearance model of CIECAM02 is applied to, among the image data A, only those data that satisfy predetermined conditions while a simple color appearance model whose load is lighter than CIECAM02 is applied to those data that do not satisfy the predetermined conditions. In the present embodiment, a von Kries adaptation transformation formula is adopted as the simple color appearance model.

(von Kries Adaptation Transformation Formula)

Hereinafter, explanation will be made on a von Kries adaptation transformation formula and a color appearance model of CIECAM02. The predetermined conditions will be explained thereafter.

The von Kries adaptation transformation formula is as follows. The von Kries adaptation transformation formula takes into consideration only white point transformation. This predicts or estimates tristimulus values of a subject under a viewing illumination $(X_{est}, Y_{est}, Z_{est})$ from tristimulus values of the subject under an image-capturing illumination $(X_{ori}, Y_{ori}, Z_{ori})$ according to the following formula. The tristimulus values of the subject under the viewing illumination $(X_{est}, Y_{est}, Z_{est})$ and the tristimulus values of the subject under the image-capturing illumination $(X_{ori}, Y_{ori}, Z_{ori})$ are expressed in the CIE 1931 XYZ color system and each pixel has stimulus values of X, Y, Z.

$$\begin{bmatrix} X_{est} \\ Y_{est} \\ Z_{est} \end{bmatrix} = A^{-1} \cdot \begin{bmatrix} \frac{L_{est\_w}}{L_{ori\_w}} & 0 & 0 \\ 0 & \frac{M_{est\_w}}{M_{ori\_w}} & 0 \\ 0 & 0 & \frac{S_{est\_w}}{S_{ori\_w}} \end{bmatrix} \cdot A \cdot \begin{bmatrix} X_{ori} \\ Y_{ori} \\ Z_{ori} \end{bmatrix} \quad \text{[Expression 1]}$$

Here, a matrix A is a matrix that transforms tristimulus values into cone responses LMS and as such, for example, a Bradford transformation matrix may be used. Further, $L_i$, $M_i$, $S_i$ (i=est_w, ori_w) are LMS responses of white under the image-capturing illumination conditions and the viewing illumination conditions, respectively. If the white point of the image-capturing illumination is input as the image-capturing condition, $L_{ori-w}$, $M_{ori-w}$, $S_{ori-w}$ are derived while if the white point of the viewing illumination is input as the viewing condition, $L_{est-w}$, $M_{est-w}$, $S_{est-w}$ are derived. By using the model according to the von Kries adaptation transformation formula, white point transformation can be predicted by calculating a 3×3 matrix operation. That is, according to the von Kries adaptation transformation formula, transformation can be performed by a simple method using only the four basic operations of arithmetic.

(Color Appearance Model of CIECAM02)

Figure 3:
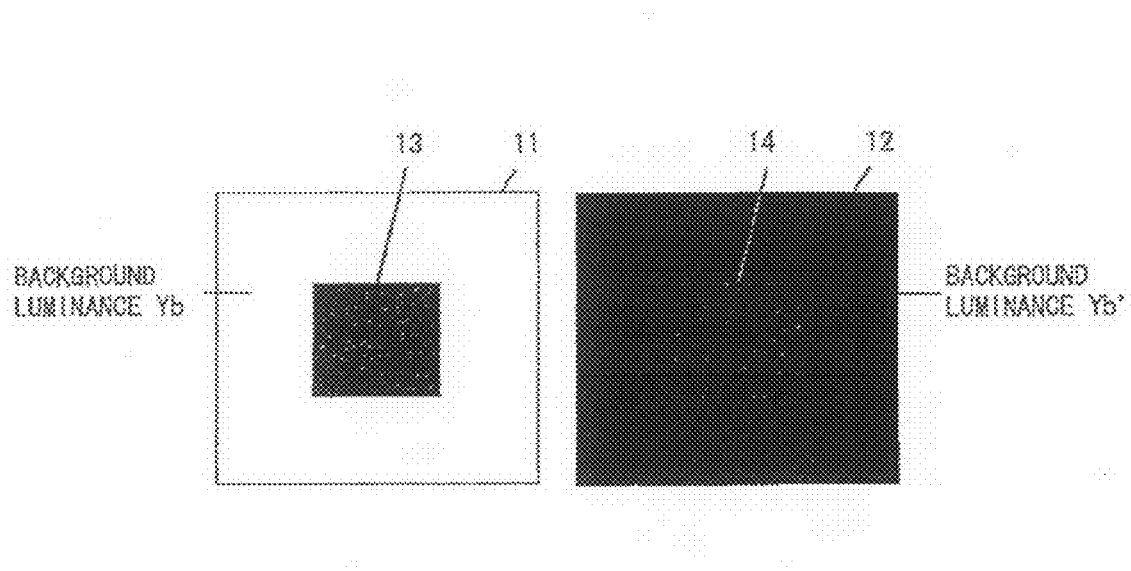
FIG. 3 is a diagram showing patches for use in a color appearance experiment.

Next, CIECAM02 will be explained. FIG. 3 is a diagram showing patches used in a color appearance experiment. Gray color patches 13 and 14 in the center of the two patches 11 and 12, respectively, as shown in FIG. 3 are perceived by human eye as different colors despite the fact that the patches are of the same color depending on whether the surrounding background luminance Yb and Yb' are high or low. On the patches 11 and 12 shown in FIG. 3, there are placed the color patches 13 and 14, respectively, in a visual field of 2 degrees from the center of each patch and in a visual field of 2 to 10 degrees outside the color patches 13 and 14, respectively, background luminances Yb and Yb' are set.

In CIECAM02, influences of a difference in a white point of a source of illumination, a difference in a device luminance, a ratio of a device luminance to a surround luminance, a difference in a background luminance and so on are taken into consideration, and there is provided a transformation formula such that the color appearances coincide with each other by using the patches 11 and 12 as shown in FIG. 3 and taking into consideration various types of view environments. In the present embodiment, CIECAM02 is adopted as a color appearance model that provides a more detailed color appearance. The device luminance refers to a luminance of an illumination that illuminates the subject upon image-capturing while, upon viewing, it refers to a luminance of a monitor if the monitor is used for viewing, or to a luminance of an illumination that illuminates a print if the print is used for viewing.

Hereinafter, outline of CIECAM02 will be explained. For more details, reference is made to CIE TC8-01 Technical Report. In the following, a suffix w indicates that the value concerned relates to white. Various types of parameters used in CIECAM02 are set by inputting tristimulus value $(X_W, Y_W, Z_W)$ of a white point of an illumination upon image-capturing, an adapted luminance $L_A$ to which eyes are adapted upon image-capturing, and a ratio s of a luminance of illumination to a surround luminance as image-capturing conditions as well as tristimulus value $(X_W', Y_W', Z_W')$ of a white point of an illumination upon viewing, an adapted illumination $L_A'$ upon viewing, and a ratio s' of a device luminance to a surround luminance.

1. Set viewing parameters (c, Nc, F) corresponding to the ratio s of the device luminance to the surround luminance;
2. Set adaptation luminance $L_A$;
3. Transform CIE 1931 XYZ tristimulus values to a color space that explains chromatic adaptation well using a 3×3 matrix $M_{CAT02}$;

$$\begin{bmatrix} R \\ G \\ B \end{bmatrix} = M_{CAT02} \begin{bmatrix} X \\ Y \\ Z \end{bmatrix} \quad \text{[Expression 2]}$$

4. Calculate an adaptation factor (degree of adaptation) D using $L_A$;

$$D = F\left[1 - \left(\frac{1}{3.6}\right)e^{\left(\frac{-(L_A+42)}{92}\right)}\right] \quad \text{[Expression 3]}$$

5. Use the adaptation factor D in a chromatic adaptation formula;

$$R_c = \left[\left(Y_w \frac{D}{R_w}\right) + (1-D)\right]R \quad \text{[Expression 4]}$$

$$G_c = \left[\left(Y_w \frac{D}{G_w}\right) + (1-D)\right]G$$

$$B_c = \left[\left(Y_w \frac{D}{B_w}\right) + (1-D)\right]B$$

6. Transform the results into the Hunt-Pointer-Estevez space using the above 3×3 matrix $M_{CAT02}$ and a transformation matrix $M_{HPE}$ to a Hunt-Pointer-Estevez space;

$$\begin{bmatrix} R' \\ G' \\ B' \end{bmatrix} = M_{HPE} M_{CAT02}^{-1} \begin{bmatrix} R_c \\ G_c \\ B_c \end{bmatrix} \quad \text{[Expression 5]}$$

7. Calculate the following coefficients that depend on a viewing environment $$k = 1/(5L_A + 1) \quad \text{[Expression 6]}$$

$$F_L = 0.2k^4(5L_A) + 0.1(1-k^4)^2(5L_A)^{1/3}$$

$$n = Y_b/Y_w$$

$$N_{bb} = N_{cb} = 0.725(1/n)^{0.2}$$

$$z = 1.48 + \sqrt{n}$$

8. Perform a nonlinear transformation of a cone response $$R'_a = \frac{400(F_L R'/100)^{0.42}}{27.13 + (F_L R'/100)^{0.42}} + 0.1 \quad \text{[Expression 7]}$$

$$G'_a = \frac{400(F_L G'/100)^{0.42}}{27.13 + (F_L G'/100)^{0.42}} + 0.1$$

$$B'_a = \frac{400(F_L B'/100)^{0.42}}{27.13 + (F_L B'/100)^{0.42}} + 0.1$$

9. Calculate a hue angle h $$a = R'_a - 12G'_a/11 + B'_a/11 \quad \text{[Expression 8]}$$

$$b = (1/9)(R'_a + G'_a - 2B'_a)$$

$$h = \tan^{-1}(b/a)$$

10. Calculate an eccentricity factor $e_t$ $$e_t = \frac{1}{4}\left[\cos\left(h\frac{\pi}{180} + 2\right) + 3.8\right] \quad \text{[Expression 9]}$$

11. Calculate an achromatic response A $$A = [2R'_a + G'_a + (1/20)B'_a - 0.305]N_{bb} \quad \text{[Expression 10]}$$

12. Calculate a lightness J $$J = 100(A/A_w)^{cz} \quad \text{[Expression 11]}$$

13. Calculate chroma C $$C = t^{0.9}\sqrt{J/100}\,(1.64 - 0.29^n)^{0.73} \quad \text{[Expression 12]}$$

Here, $$t = \frac{(50000/13)N_c N_{cb} e_t \sqrt{a^2 + b^2}}{R'_a + G'_a + (21/20)B'_a} \quad \text{[Expression 13]}$$

J, C and h obtained in the steps 9, 12, and 13 above are parameters (data) indicating genuine color appearance that depends neither on image-capturing conditions nor on viewing conditions. Now, using these J, C and h and the viewing conditions of transformation destination, transformation is performed inversely from the steps 13 to 1 above, CIE 1931 XYZ tristimulus values in the transformation destination viewing conditions can be obtained. In the present embodiment, the image data before and after the transformation are expressed according to the CIE 1931 XYZ color system and each pixel has stimulus values of X, Y, and Z.

In "7. Calculate the following coefficients that depend on a viewing environment" above, Yb represents the background luminance described above. The background luminance Yb is obtained by calculating an average luminance of all the pixels in a peripheral visual field of 10 degrees for each pixel. For example, if a pixel range covered by a peripheral visual field of 10 degrees is a range of 9×9 pixels, an average of luminances of the 9×9 pixels is calculated. Yw represents a relative value of a white point luminance, which usually assumes 100.

(Color Appearance Experiment)

Next, the above-mentioned predetermined conditions are explained. First, using two patches 11 and 12 as shown in FIG. 3, an experiment is conducted as follows. That is, in the patch 12, colors having been subjected to color transformation according to CIECAM02 with varying the background luminance and the viewing environment conditions are applied to the color patch 14 and a person selects a patch 14 that gives a corresponding color appearance with the central color patch 13. For example, as shown in FIG. 3, two patches 11 and 12 having different background luminances are compared. The left hand side patch 11 is not changed at all, while the right hand side patch 12 is changed such that parameters indicating a background luminance and viewing environment conditions are gradually varied to gradually change the color patch 14 in the center to prepare a plurality of patches. Then, an experiment is conducted in which a plurality of persons are asked to select a right hand patch 14 that gives a corresponding color appearance with the left hand side color patch 13.

Similarly, there are conducted experiments in which viewing environment conditions are varied between two patches having an identical background luminance.

Figure 4:
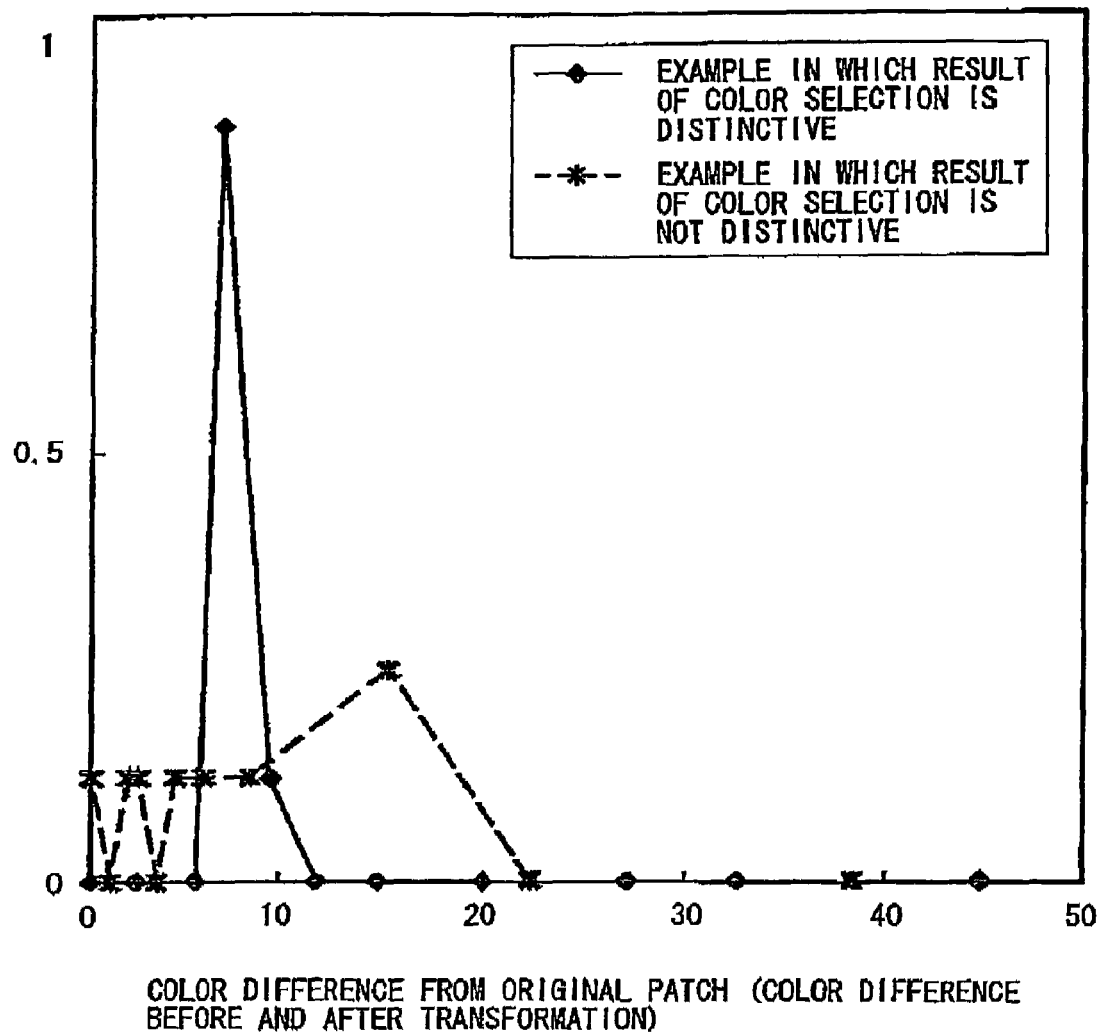
FIG. 4 is a diagram showing a result of an experiment in a first embodiment of the present invention.

FIG. 4 is a diagram showing an example of the results of the experiment. In FIG. 4, a horizontal axis indicates in terms of color difference how remote is the color of the right hand side color patch 14 that has been selected as giving a corresponding color appearance with the original color patch (the color of the let hand side color patch 13 that has a fixed color). A vertical axis indicates a ratio of selection of the patch (number of persons who selected/number of all the persons).

Further, when experiments are conducted with varying the color of central color patch in the left hand side patch, it reveals that there are a color that gives a distinctive result as indicated by a solid line and a color that does not give a distinctive result as indicated by a broken line as shown in FIG. 4. By the term "gives a distinctive result", it is meant that there is a specified color that is selected by many persons as providing a corresponding color appearance as influenced by a background luminance and a viewing environment, although actually it is not the same color. In such a case, if the same experiment is repeated by the same person in order to confirm reproducibility, the same results are obtained. That is, in the case of the patch indicated by the solid line, the reproducibility is high.

On the other hand, by the term "does not give any distinctive result" is meant that while the color appearance varies as influenced by a background luminance and a viewing environment, the color that is selected as providing a corresponding color appearance is different depending on the person who selects. In such a case, if the same experiment is repeated by the same person in order to confirm reproducibility, the same result will not be obtained. That is, in the case of the patch indicated by the broken line, the reproducibility is low with considerable variation.

This experiment is performed on various colors in advance to classify the colors into a group of colors giving distinctive results and a group of colors not giving distinctive results, and a color gamut to which the former group of colors belongs is defined as a predetermined color gamut, whose data are stored. Whether or not a color belongs to the predetermined color gamut is defined as the predetermined conditions. Note that each color contained in a color gamut can be identified by X, Y, and Z stimulus values in the present embodiment.

The term "color" as mentioned in the case where a color gives a distinctive result and a color that does not give a distinctive result refers to the color of the color patch 13 in the patch 11 as shown in FIG. 3. That is, if a certain color gives a different color appearance when the background luminance is varied as shown in FIG. 3 and under the varied background luminance, the different color that is remote by a specified color difference from the certain color is perceived by many persons to be a corresponding color appearance with the original color being the certain color, then the original color is deemed to be a color that gives a distinctive result. Also, in case the visual environment, that is, viewing environment (viewing conditions) is varied, if a color that is remote by a specified color difference from an original color under the varied viewing environment is perceived by may persons to be a corresponding color appearance with the original color, then the original color is deemed to be a color giving a distinctive result.

(Transformation Processing)

Figure 5:
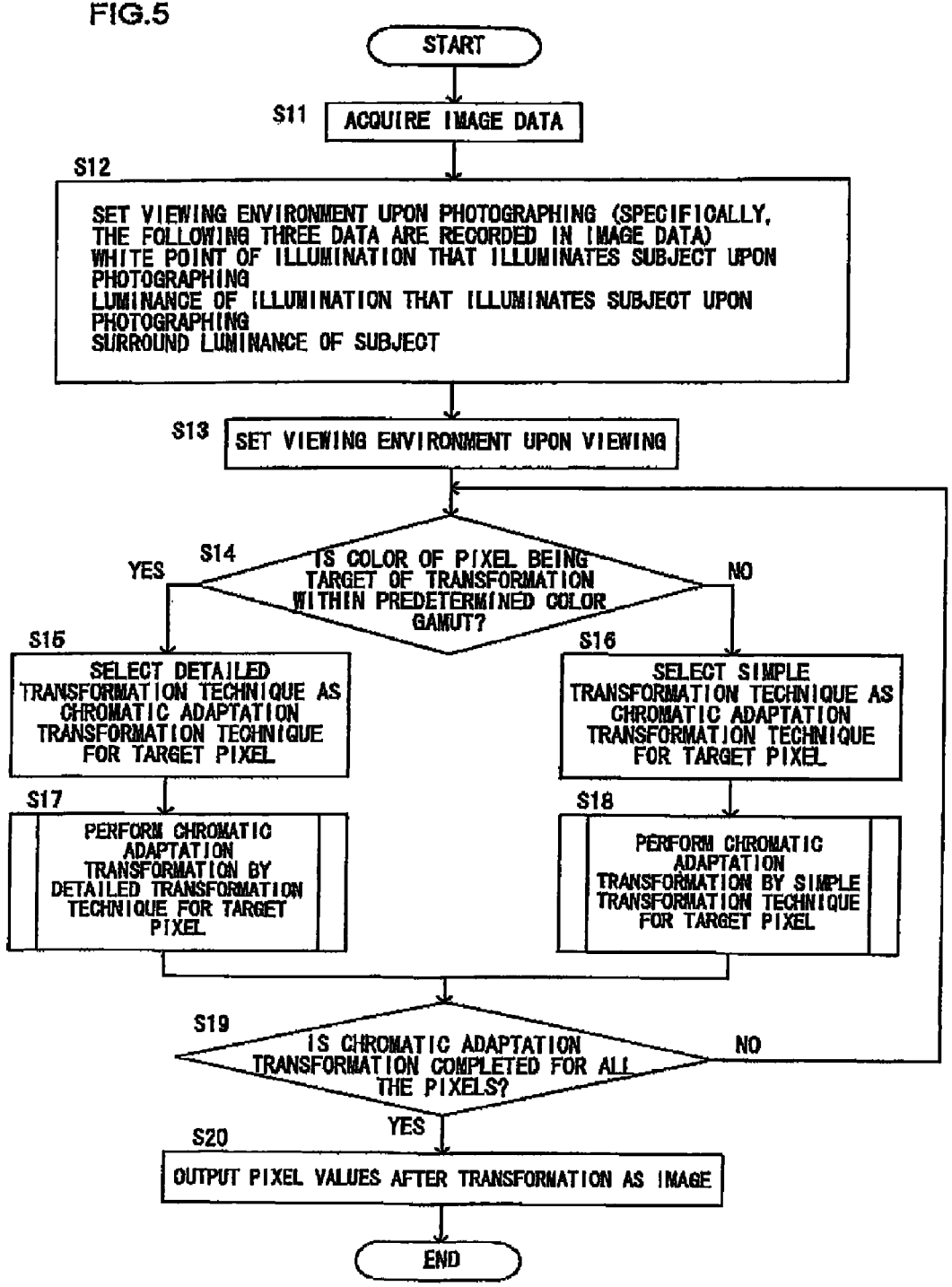
FIG. 5 is a flowchart illustrating processing in the first embodiment.

FIG. 5 is a diagram presenting a flowchart illustrating the processing to be executed by the personal computer 1 in the first embodiment. In a step S11, image data of an image photographed (captured) are acquired which are desired to be reproduced with a color appearance at the time of image-capturing under viewing conditions by applying a color appearance model. In a step S12, viewing environment data are read in from the acquired image data and a viewing environment upon photographing is set. As the viewing environment data upon photographing, specifically, a white point of an illumination that illuminates a subject upon photographing, a luminance of an illumination that has illuminated a subject upon photographing, a surround luminance of a subject, and so on are read in.

In the present embodiment, a digital camera that outputs image data acquired in the step S11 is supposed to have the following functions. That is, the digital camera has an auto white balancing function (AWB), which is a function of estimating a white point of the illumination upon photographing, and recording the estimated white point in the image data. Also, the digital camera is configured to have a photometric function for automatically adjusting exposure and estimate, by analyzing this result, a luminance of the illumination that has been illuminating a subject upon photographing, and recording the estimated luminance of the illumination in the image data. Further, the digital camera is configured to have a function of measuring a surround luminance around a subject to be photographed by using a result of measuring performed with broadening a photometric range or a photometric function provided in the camera for measuring a surround luminance, and recording the measured surround luminance of the subject in the image data.

Note that it would be also acceptable to perform in the personal computer 1 estimation processing for estimating a white point of an illumination upon photographing, estimation processing for estimating a luminance of an illumination that has been illuminating a subject upon photographing, estimation processing for estimating a luminance around the subject using the data relating to auto white balancing, the photometric data, the result obtained by measuring with broadening the photometric range, and output data from a sensor provided in the camera for measuring a surround luminance, recorded in the image data.

In a step S13, a viewing environment upon viewing is set. When viewing is performed on a monitor, an sRGB environment, which is a standard viewing environment, is assumed as the viewing environment and setting is performed as follows: luminance upon viewing=80 Cd/m$^2$, white point=D65, and surround luminance=4.1 Cd/m$^2$. Alternatively, values input by the operation of a keyboard by a user (viewer) are used. In this manner, parameters necessary for the plurality of color appearance models, such as the viewing environment upon photographing, and the viewing environment upon observing or viewing are set.

In a step S14, to perform color transformation pixel by pixel, it is judged whether or not the color of a pixel being a target of transformation is within the predetermined color gamut obtained by the above-mentioned experiment (a color giving a distinctive result). The color included in the predetermined color gamut is stored in advance as data based on the experiment and the judgment whether or not the color of a pixel is within the predetermined color gamut can be made by referring to the data.

If the color is within the predetermined color gamut, the flow of control proceeds to a step S15. In the step S15, a chromatic adaptation transformation using a detailed color appearance model is selected as a chromatic adaptation transformation technique (method) for a target pixel. In a step S17, chromatic adaptation transformation is performed by a detailed transformation technique (method) for the target pixel. That is, the color appearance is predicted by applying the detailed color appearance model.

On the other hand, if the color is outside the predetermined color gamut, the flow of control proceeds to a step S16. In the step S16, a chromatic adaptation transformation using a simple color appearance model is selected as a chromatic adaptation transformation technique (method) for a target pixel. In a step S18, a chromatic adaptation transformation is performed by a simple transformation technique (method) for a target pixel. That is, the color appearance is predicted by using a simplified color appearance model. The reason for this is that since the result is not distinctive, the influence on the color appearance will not be so serious if the detailed color appearance model is not used for the prediction.

In a step S19, it is judged whether or not the chromatic adaptation transformation has been completed for all the pixels. If the chromatic adaptation transformation for all the pixels has not been completed yet, the flow of control returns to the step S14 to repeat the processing. If the chromatic adaptation transformation has been completed for all the pixels, the flow of control proceeds to a step S20. In the step S20, pixel values after the transformation are output as image data and the flow of control of this routine terminates.

Figure 10:
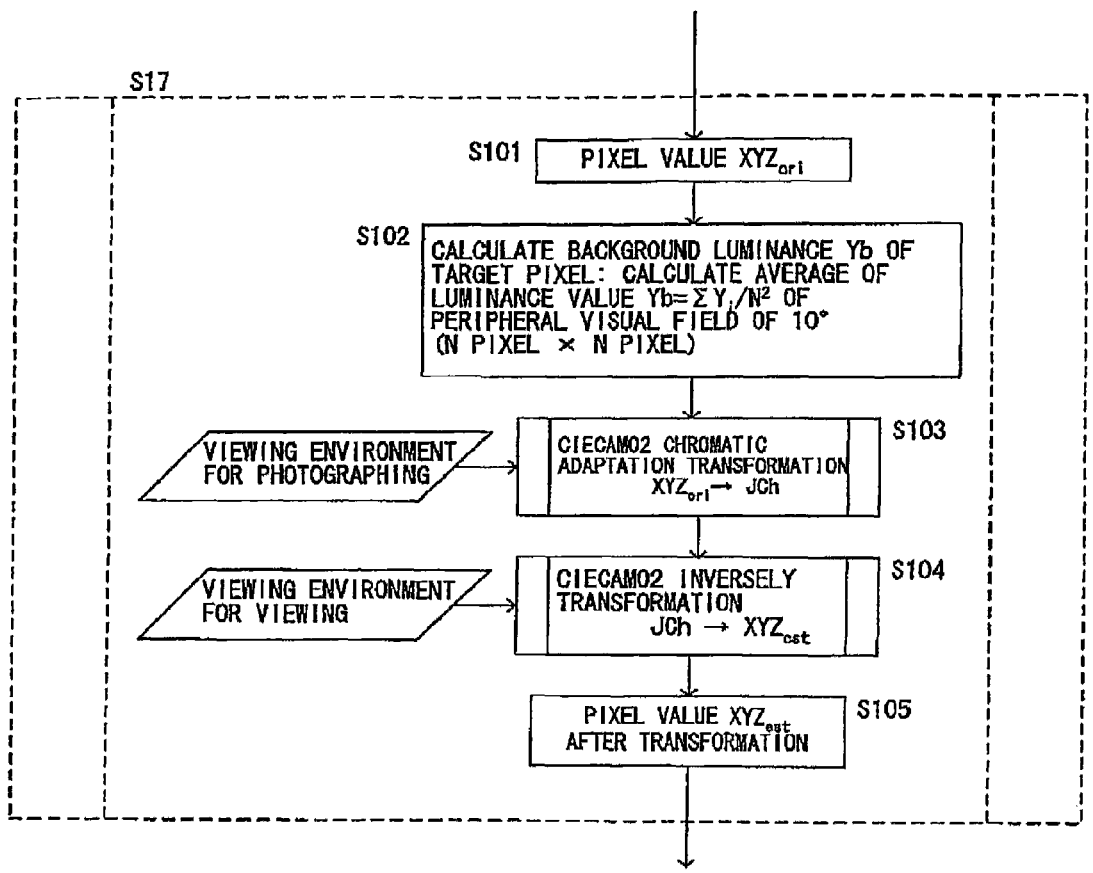
FIG. 10 is a diagram showing details of processing in a step S17 in FIG. 5.

FIG. 10 is a diagram illustrating details of the processing in the step S17. In a step S101, pixel values $XYZ_{ori}$ are obtained from the image data acquired in the step S11. In the present embodiment, since the image data are supposed to be expressed according to the CIE 1931 XYZ color system, the pixel values $XYZ_{ori}$ can be obtained directly from the image data. However, if the image data expressed according to the RGB color system are acquired, the image data are transformed from the RGB color system to the XYZ color system by a predetermined transformation formula.

In a step S102, a background luminance Yb of the target pixel is calculated. An average luminance $\Sigma Y_i/N^2$ in a range of the peripheral visual field of 10 degrees (N pixel×N pixel) is calculated and the result is defined as Yb. N represents, for example, 9 pixels as described above. In a step S103, the chromatic adaptation transformation processing according to CIECAM02 is performed based on the viewing environment data upon photographing set in the step S12. In concrete terms, the processing explained in steps 1 to 13 in the (Color appearance model of CIECAM02) described above is performed.

In a step S104, the chromatic adaptation reverse transformation processing according to CIECAM02 is performed based on the viewing environment data upon viewing set in the step S12. In concrete terms, the processing explained in steps 1 to 13 in the (Color appearance model of CIECAM02) described above is performed from step 13 in a reverse order. In a step S105, pixel values $XYZ_{est}$ after transformation are obtained. Note that when image data expressed in the RGB color system are necessary, the image data are transformed from the XYZ color system to the RGB color system by a predetermined transformation formula.

Figure 11:
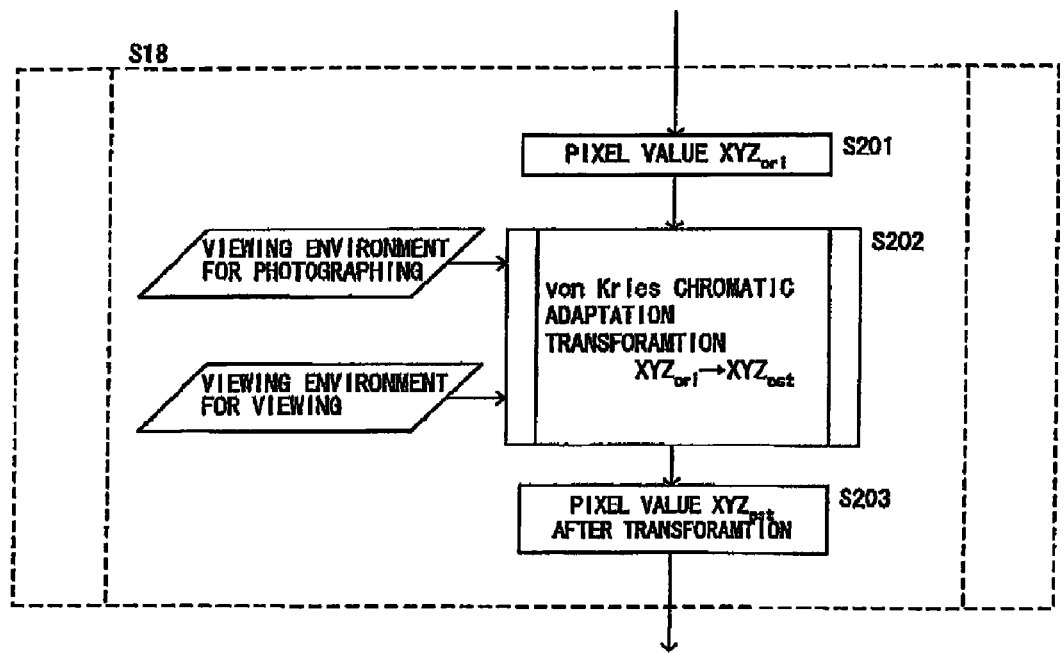
FIG. 11 is a diagram showing details of processing in a step S18 in FIG. 6.

FIG. 11 is a diagram illustrating details of the processing in the step S18. In a step S201, pixel values $XYZ_{ori}$ are obtained from the image data acquired in the step S11. In the present embodiment, since the image data are supposed to be expressed according to the CIE 1931 XYZ color system, the pixel values $XYZ_{ori}$ can be obtained directly from the image data. However, if the image data expressed according to the RGB color system are acquired, the image data are transformed from the RGB color system to the XYZ color system by a predetermined transformation formula.

In a step S202, chromatic adaptation transformation according to the von Kries adaptation transformation formula is performed based on the viewing environment data upon photographing set in the step S12 and the viewing environment data upon viewing set in the step S13. The von Kries adaptation transformation formula is as explained in the von Kries adaptation transformation formula above. In a step S203, pixel values $XYZ_{est}$ after transformation are obtained. Note that when image data expressed in the RGB color system are necessary, the image data are transformed from the XYZ color system to the RGB color system by a predetermined transformation formula.

As described above, with the image processing device according to the present embodiment, the processing time can be made shorter than in the case where the detailed color appearance model is applied to the whole image, and also the color appearance of the whole image can be predicted accurately.

Second Embodiment

A second embodiment of the present invention is featured in that when a color appearance model is selected, classification is made not by the color gamut determined as in the first embodiment but by a luminance. Note that since a luminance is one of the parameters that determine the color gamut, the classification according to a luminance is also included by the concept of classification of a color gamut. Since the configuration of the image processing device according to the second embodiment is similar to that of the image processing device according to the first embodiment, reference is made to FIG. 1 and explanation thereon will be omitted here.

Figure 6:
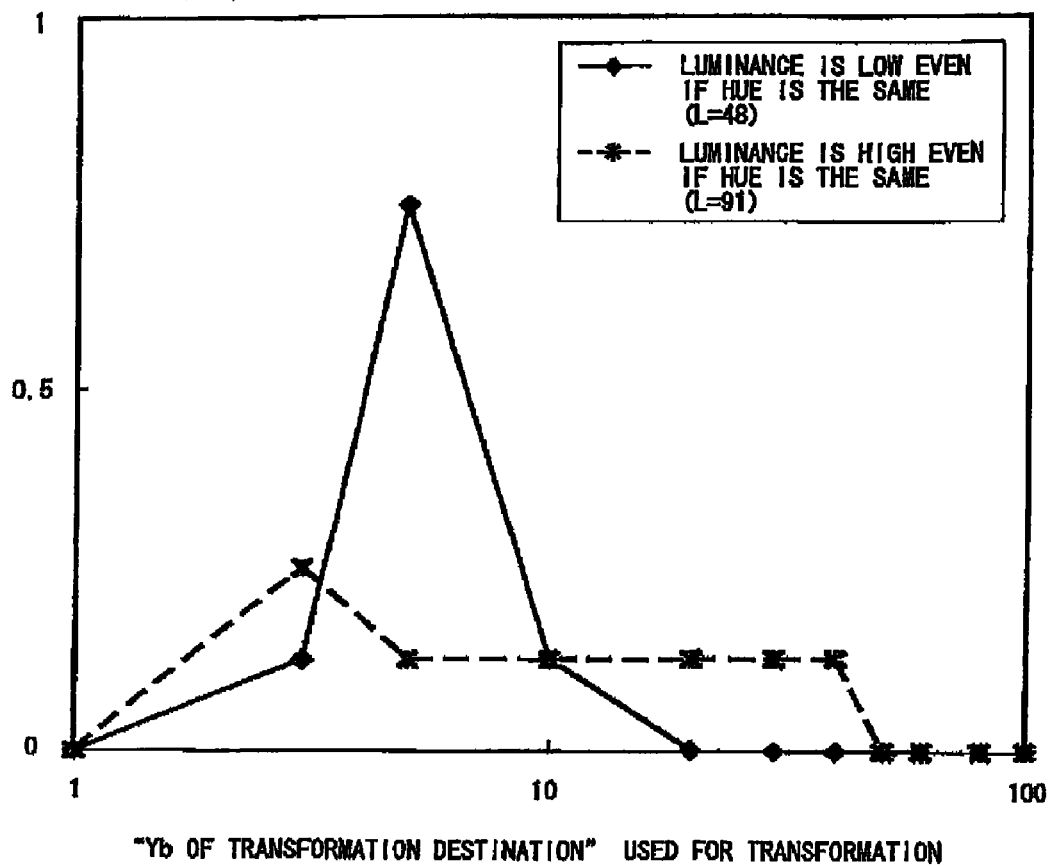
FIG. 6 is a diagram showing a result of an experiment in a second embodiment of the present invention.

FIG. 6 illustrates an example of the results of a color appearance experiment similar to the experiment explained in the first embodiment. The experiment is conducted as follows. A color appearance is predicted from the color of the left hand side color patch 13 using CIECAM02 when the background luminance is varied from Yb to any Yb', in the two patches 11 and 12 having different background luminances as shown in FIG. 3, and the result of the prediction of a color appearance is deemed to be the color of the color patch 14 in the right hand side patch 12. Samples are prepared as follows. The actual background luminance Yb' of the right hand side patch 12 is not varied regardless of whatever value the Yb' input to CIECAM02 is. A sample is obtained by transforming with the transformation destination background luminance to be applied to CIECAM02 being exactly set to Yb', and adopting the result of the transformation as the right hand side color patch 14. And a plurality of samples are obtained by predicting a color appearance such that the transformation destination background luminance to be applied to CIECAM02 is varied from the actual background luminance Yb' of the patch 12 and defining the result of the prediction as the color of the right hand side color patch 14. Then, persons are asked to select a right hand side sample that provides a corresponding color appearance with the left hand side patch.

An example of the results of such an experiment is shown in FIG. 6. FIG. 6 shows the results of experiments performed on two sets of color patches 13 under experimental conditions of a hue angle of 196 degrees in L*a*b* space and a luminance L* being different from each other. The experimental results indicate that even when the hue is the same, if the luminance of the color patch 13 is high, the results vary greatly and on the contrary, if the luminance of the color patch 13 is low, distinctive results are obtained. That is, the solid line in FIG. 6 indicates that even when the hue is the same and if the luminance is low, many persons select the color appearance that has been predicted by CIECAM02. On the other hand, the broken line in FIG. 6 indicates that even when the hue is the same and if the luminance is high, many persons do not always select the color appearance predicted by CIECAM02. In other words, for colors each having a low luminance even when they have the same hue, the color appearance prediction is more correct when the prediction is made using the detailed color appearance model than otherwise whereas for colors having high luminance even when they have the same hue, prediction using a simplified color appearance model will not so seriously affect the color appearance.

This experiment is conducted on various colors in advance and a range of the luminance in which distinctive results are obtained is determined in advance and stored. Note that for the luminance, the CIE XYZ color space is transformed into the CIE L*a*b* color space and L* is treated as a luminance. Alternatively, Y may be treated as luminance data if the experiment is performed in the L*a*b* color space to determine the range of L* in advance and then the range of Y is determined by transforming the data from the CIE L*a*b* color space into the CIE XYZ color space.

Figure 7:
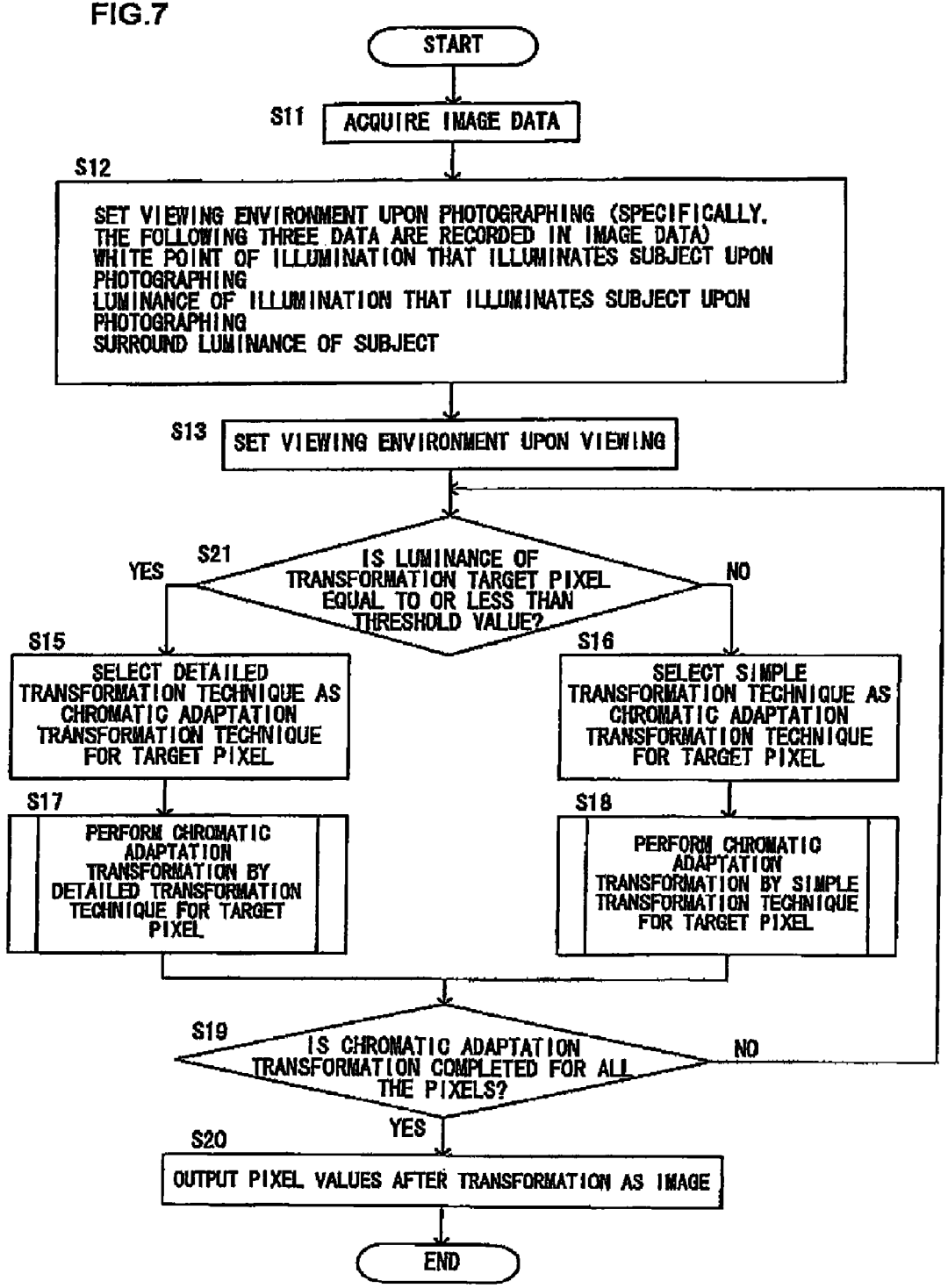
FIG. 7 is a flowchart illustrating processing in the second embodiment.

FIG. 7 is a flowchart illustrating the processing in the second embodiment. Since FIG. 7 differs from FIG. 5 in the first embodiment only in a step S21, explanation hereinafter is focused on the step S21 and explanation on the other steps will be omitted here.

In the step S21, to transform color transformation pixel by pixel, it is judged whether or not the luminance of a target pixel is equal to or less than a predetermined threshold value obtained by the above-mentioned experiment. The predetermined threshold value is stored in advance as data based on the experimental results and the judgment whether or not the luminance of a pixel is equal to or less than the predetermined threshold value can be made by referring to the data.

If the luminance of a pixel is equal to or less than the predetermined threshold value, the flow of control proceeds to a step S15. In the step S15, a detailed color appearance model is applied to predict a color appearance. On the other hand, if the luminance of a pixel is more than the predetermined threshold value, the flow of control proceeds to a step S16. In the step S16, a color appearance is predicted by applying a simplified color appearance model. This is because since the result is not distinctive, there will be expected no serious adverse influences on the color appearance if the prediction is not performed by using the detailed color appearance model.

As described above, also with the image processing device according to the present embodiment, similarly to the first embodiment, the processing time can be made shorter than in the case where the detailed color appearance model is applied to the whole image and the color appearance of the whole image can be predicted accurately.

Third Embodiment

A third embodiment of the present invention is featured in that when a color appearance model is selected, classification is made not by the luminance determined as in the second embodiment but by a hue. Note that since the hue is one of the parameters that determine the color gamut, the classification according to the hue is also included by the concept of classification of the color gamut. Since the configuration of the image processing device according to the third embodiment is similar to that of the image processing device according to the first embodiment, reference is made to FIG. 1 and explanation thereon will be omitted here.

Figure 8:
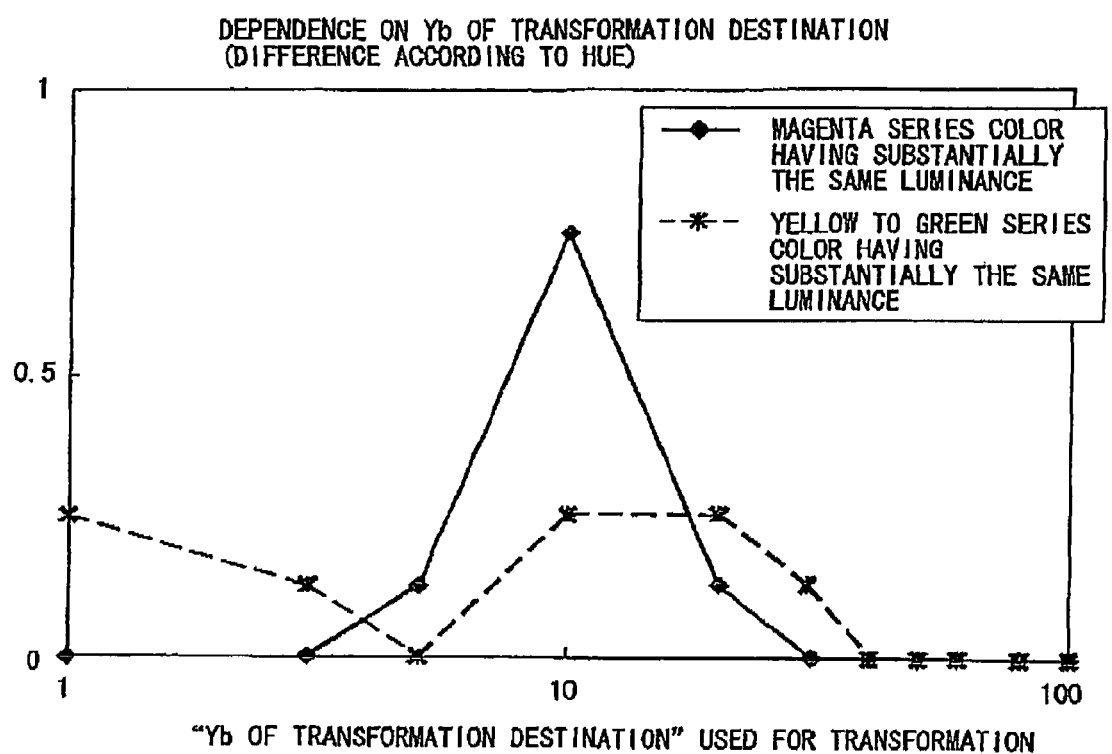
FIG. 8 is a diagram showing a result of an experiment in a third embodiment of the present invention.

FIG. 8 illustrates an example of the results of color appearance experiment similar to the experiment explained in the second embodiment. The experiment is conducted as follows. A color appearance is predicted from the color of the left hand side color patch 13 using CIECAM02 when the background luminance is varied from Yb to any Yb', in the two patches 11 and 12 having different background luminances as shown in FIG. 3, and the result of the prediction of a color appearance is deemed to be the color of the color patch 14 in the right hand side patch 12. Samples are prepared as follows. The actual background luminance Yb' of the right hand side patch 12 is not varied regardless of whatever value the Yb' input to CIECAM02 is. A sample is obtained by transforming with the transformation destination background luminance to be applied to CIECAM02 being exactly set to Yb', and adopting the result of the transformation as the right hand side color patch 14. And a plurality of samples are obtained by predicting a color appearance such that the transformation destination background luminance to be applied to CIECAM02 is varied from the actual background luminance Yb' of the patch 12 and defining the result of the prediction as the color of the right hand side color patch 14. Then, persons are asked to select those samples that provide corresponding color appearance with the left hand side patch. Note that in the present embodiment, a plurality of colors with different hues are displayed on the left hand side color patch 13 and the above-mentioned experiment is conducted for each color of a different hue to obtain a frequency of being perceived as the same color, hue by hue, after color transformation is conducted with varying environment condition.

An example of the results of such an experiment is shown in FIG. 8. The experimental results indicate that even when the luminance is of a similar level, in the case of, for example, colors of Yellow to Green chromatic series, the results vary greatly and on the contrary, in the case of, for example, magenta, distinct results are obtained. That is, the solid line in FIG. 8 indicates that even when the luminance is of a similar level, in the case of magenta, many persons select the color appearance that has been predicted by CIECAM02. On the other hand, the broken line in FIG. 8 indicates that even when the luminance is of a similar level, in the case of colors of Yellow to Green chromatic series, it can not be said that many persons always select the color appearance predicted by CIECAM02. In other words, for colors each having a hue of magenta series, even when they have luminances of similar levels, the color appearance prediction is more accurate when the prediction is made using the detailed color appearance model than otherwise whereas for colors having each having a hue of Yellow to Green series even when they have luminances of similar levels, prediction using a simplified color appearance model will not so seriously affect the color appearance.

This experiment is performed on various colors in advance to determine in advance a range of the hue in which distinctive results are obtained and this range is stored as data. Note that for hues, the CIE XYZ color space is transformed to a color space of CIE L*a*b* and data of a* and b* are used. It would also be acceptable to use a hue angle of $h=\tan^{-1}(b^*/a^*)$.

Figure 9:
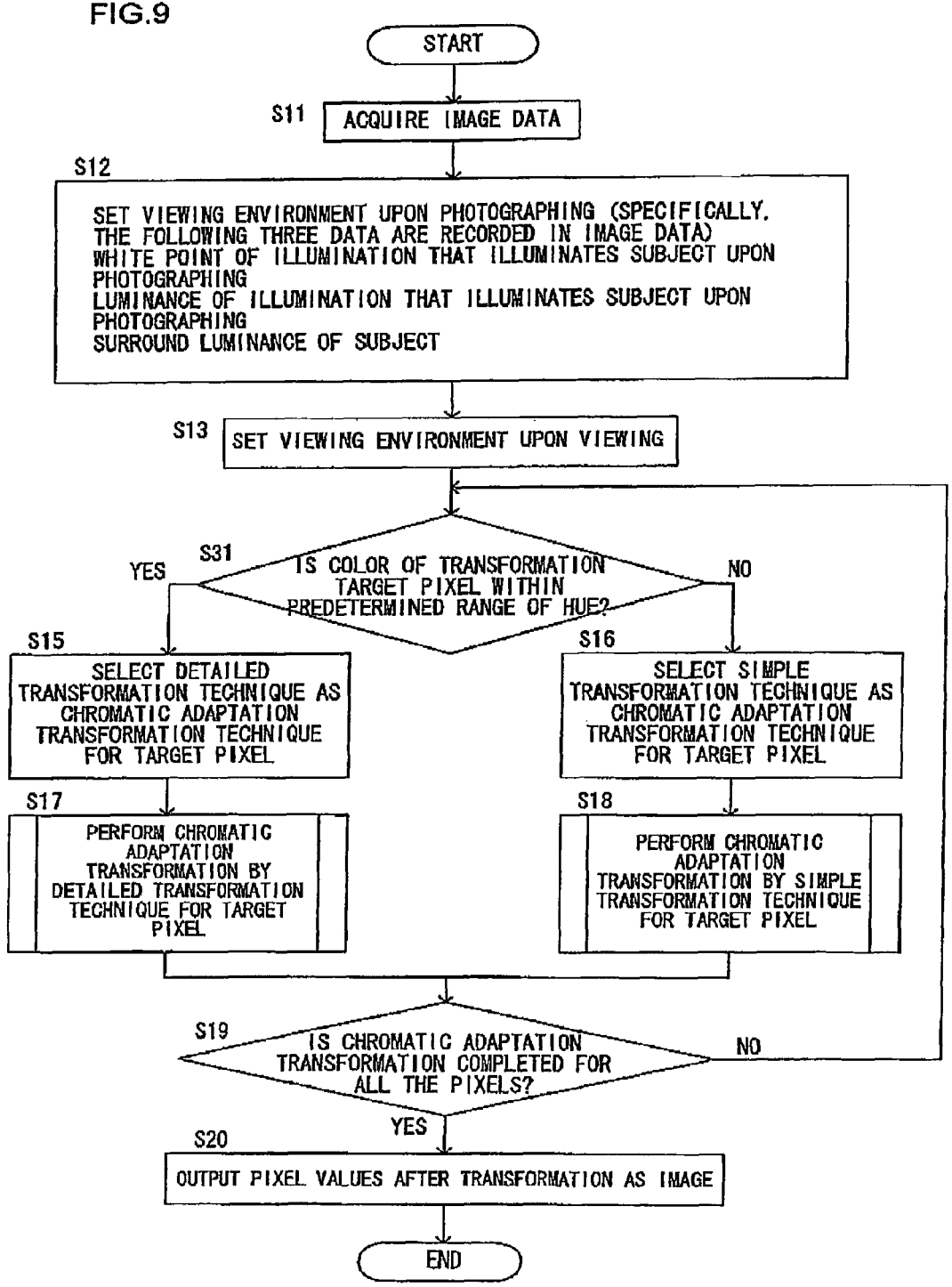
FIG. 9 is a flowchart illustrating processing in the third embodiment.

FIG. 9 is a flowchart illustrating the processing in the third embodiment. Since FIG. 9 differs from FIG. 5 in the first embodiment only in a step S31, explanation hereinafter is focused on the step S31 and explanation on the other steps will be omitted here.

In the step S31, to perform the color transformation pixel by pixel, it is judged whether or not the hue of a target pixel is within the predetermined range of the hue obtained by the above-mentioned experiment. The predetermined range of the hue is stored in advance as data based on the experimental results and the judgment whether or not the color of a pixel is within the predetermined range of the hue can be made by referring to the data.

If the color of a pixel is in the predetermined range of the hue, the flow of control proceeds to a step S15. In the step S15, a detailed color appearance model is applied to predict a color appearance. On the other hand, if the color of a pixel is outside the predetermined range of the hue, the flow of control proceeds to a step S16. In the step S16, a simplified color appearance model is applied to predict a color appearance. The reason for this is that since the result is not distinctive, there will be expected no serious adverse influences on the color appearance if the prediction is not performed by using the detailed color appearance model.

As described above, also with the image processing device according to the present embodiment, the processing time can be made shorter than in the case where the detailed color appearance model is applied to the whole image and the color appearance of the whole image can be predicted accurately.

Fourth Embodiment

In the first to third embodiments, explanation has been made on the examples in which selection is made as to which transformation technique is to be applied pixel by pixel. On the contrary, in a fourth embodiment of the present invention, explanation is made on an example in which instead of performing this selection pixel by pixel, a plurality of neighboring pixels are treated as one region in image data to divide the image data into a plurality of regions and it is determined which one of the transformation techniques is to be applied to the regions region by region. That is, in the same region, the same technique is used to perform the transformation even if the state of color of each pixel is changed. Note that since the construction of the image processing device in the fourth embodiment is the same as that in the first embodiment, reference is made to FIG. 1 for details and description thereof will be omitted here.

In the present embodiment, division of the image data into regions is realized by adopting a dividing method in which the image data are divided into a plurality of closed spaces extracted by edge extraction and an outside thereof. Note that a method may also be adopted in which if color differences of adjacent pixels are close to each other, the pixels are deemed to belong to the same region and if the color difference of pixels is remote from a predetermined value, a region is created by division. In this case, the image data are transformed from the XYZ color system to the L*a*b* color system and a color difference $\Delta E$ between adjacent pixels L1*a1*b1* and L2*a2*b2* is obtained according to the following equation.

$$\Delta E = \sqrt{((L2^* - L1^*)^2 + (a2^* - a1^*)^2 + (b2^* - b1^*)^2)}$$

Figure 12:
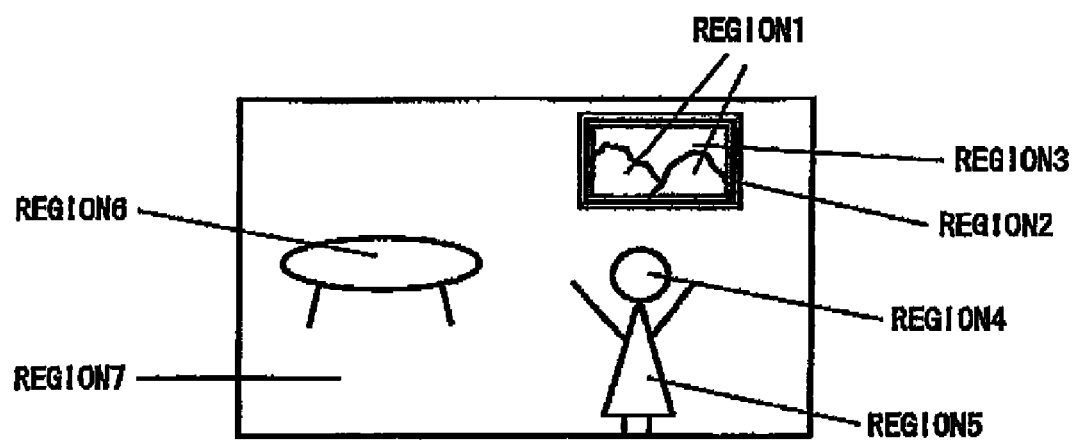
FIG. 12 is a diagram illustrating an example in which an image is divided into a plurality of regions in a fourth embodiment of the present invention.

FIG. 12 is a diagram illustrating an example of division of an image into a plurality of regions. First, edge extraction is performed on an image as shown in FIG. 12. It edge extraction is performed, the image can be divided into seven regions from the results of the edge extraction A region 1 corresponds to a part of a mountain in a frame, a region 2 corresponds to a rim of the frame, a region 3 corresponds to a background in the frame, a region 4 corresponds to the skin of a human, a region 5 corresponds to a cloth, a region 6 corresponds to a table, and a region 7 corresponds to a background other than the regions 1 to 6.

It is decided whether a detailed chromatic adaptation transformation method or a simplified chromatic adaptation transformation method is to be applied. In this manner, by selecting the same transformation method for pixels in the same region, the transformation technique is selected identically for each pixel also in the case of a region, for example, the face in the region 4, in which the luminance is distributed continuously from the cheek having a high luminance to the jaw having a low luminance. Since the boundary due to a difference in the transformation technique to be applied coincides with the contour of the subject, there will be no unnaturalness such that the boundary due to a difference in the transformation technique to be applied is conspicuous.

Which one of the transformation techniques is selected in each of the divided regions is determined by deciding a representative color for each divided region and selecting a transformation technique that is applied to all the pixels in the region with the representative color. In this case, as the color that represents the region, there may be used a color obtained by averaging colors of all the pixels in the region, a color obtained by averaging colors of pixels excepting the border portion, or a color obtained by averaging colors of a predetermined number of pixels in the vicinity of the center of the region. Here, the term "color obtained by averaging" may be meant by a color expressed in terms of an average of calorimetric values XYZ, an average of L*a*b*, or an average of a color system other than these.

Figure 13:
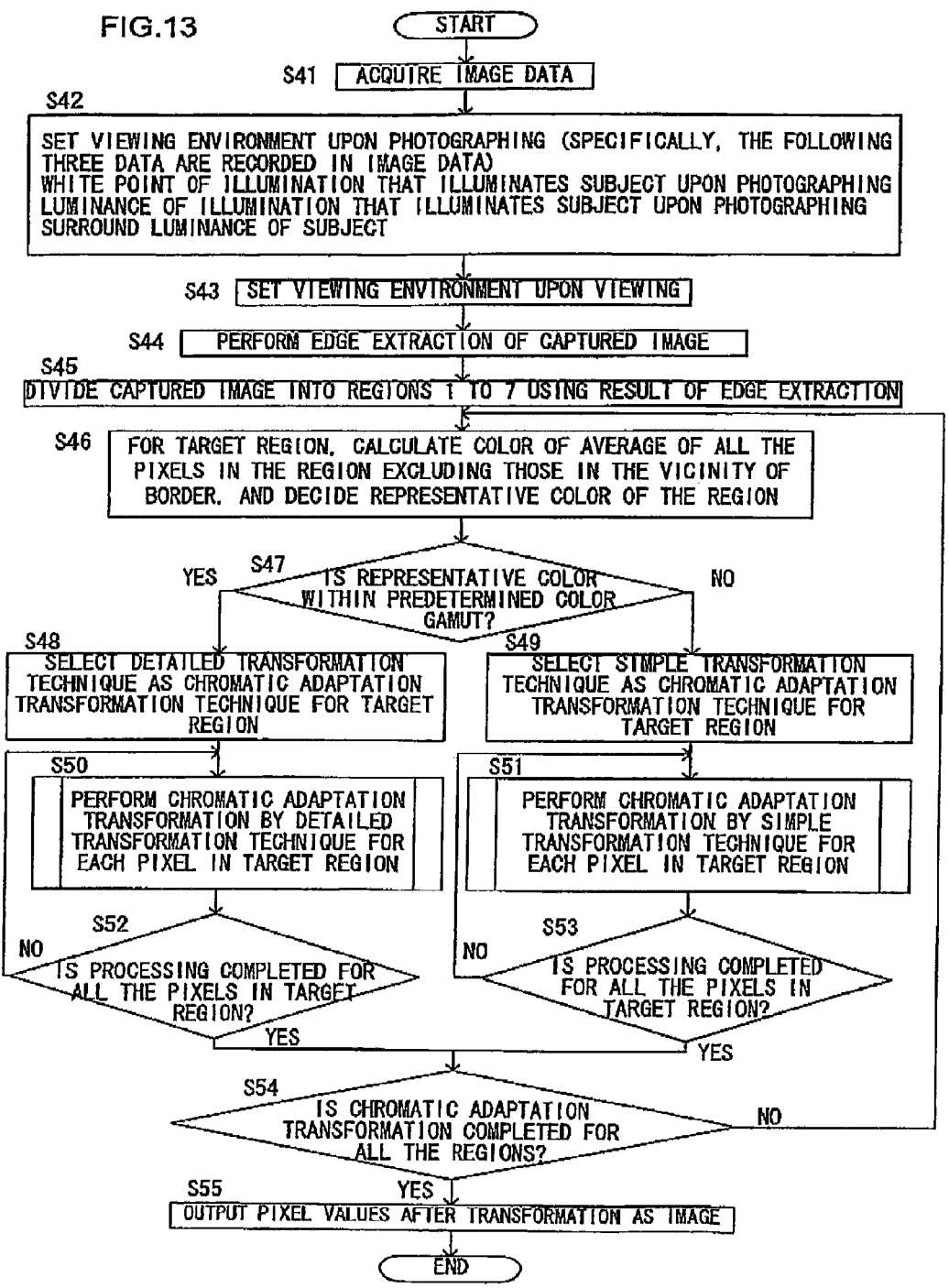
FIG. 13 is a flowchart illustrating processing in the fourth embodiment.

FIG. 13 is a flowchart illustrating the processing executed by the personal computer 1 in the fourth embodiment. The photographed image is explained with reference to FIG. 12.

Steps S41 to S43 are similar to the steps S11 to S13 in FIG. 5 in the first embodiment and explanation thereof will be omitted here. In a step S44, the image data acquired in the step S41 are analyzed to extract an edge in the image. In a step S45, the result of edge extraction in the step S44 is used to perform regional division of the photographed image into a plurality of closed spaces and an outside thereof. In the example of the photographed image shown in FIG. 12, the photographed image is divided into seven regions consisting of regions 1 to 7.

In a step S46, for each region, a color of an average of all pixels in the region excluding those pixels in the vicinity of the boundary is calculated and a representative color for the region is decided. In a step S47, it is judged whether or not the representative color of the selected region is present in a predetermined color gamut. The term "predetermined color gamut" is meant the predetermined color gamut obtained by the experiment explained in the first embodiment (a color giving a distinctive result). The color included in the predetermined color gamut is stored in advance as data based on the experiment and the judgment whether or not the representative color is within the predetermined color gamut can be made by referring to the data.

If the representative color is within the predetermined color gamut, the flow of control proceeds to a step S48. In the step S48, a chromatic adaptation transformation using a detailed color appearance model is selected as a chromatic adaptation transformation technique for a target region. In a step S50, a chromatic adaptation transformation is performed by a detailed transformation technique for each pixel in the target region. That is, the color appearance is predicted by applying the detailed color appearance model. In a step S52, it is judged whether or not the processing is completed for all the pixels in the target region. If the processing is not completed, the flow of control returns to the step S50 to repeat the processing. If the processing is completed for all the pixels in the target region, the flow of control proceeds to a step S54.

On the other hand, if the color is outside the predetermined color gamut, the flow of control proceeds to a step S49. In the step S49, a chromatic adaptation transformation using a simple color appearance model is selected as a chromatic adaptation transformation technique for a target region. That is, a simplified color appearance model is used to predict the color appearance. The reason for this is that since the result is not distinctive, the influence on the color appearance will not be so serious if the detailed color appearance model is not used for the prediction. In a step S53, it is judged whether or not the processing is completed for all the pixels in the target region. If the processing is not completed, the flow of control returns to the step S51 to repeat the processing. If the processing is completed, the flow of control proceeds to a step S54.

In the step S54, it is judged whether or not the processing is completed for all the regions. If the processing is not completed, the flow of control returns to the step S46 to repeat the processing. If the processing is completed, the flow of control proceeds to a step S55. In the step S55, pixel values after the transformation are output as image data and the flow of control of this routine terminates.

As the detailed chromatic adaptation transformation in the step S50, a chromatic adaptation transformation according to CIECAM02 is adopted similarly to the step S17 in FIG. 5. Therefore, for details of the processing in the step S50, reference is made to the explanation on the chromatic adaptation transformation by CIECAM02 in the first embodiment and explanation thereof is omitted in the present embodiment. The simple chromatic adaptation transformation in the step S51, similarly to the step S18 in FIG. 5 in the first embodiment, adopts the chromatic adaptation transformation by von Kries. Therefore, for the details of the processing in the step S51, reference is made to the explanation on the chromatic adaptation transformation in the first embodiment and the explanation thereof is omitted in the present embodiment.

Note that in the above, explanation has been made on the example in which in the step S47, it is judged whether or not the representative color of the selected region is within a predetermined color gamut. However, similarly to the second embodiment, it would also be acceptable to decide whether a detailed chromatic adaptation transformation or a simple chromatic adaptation transformation is to be performed by performing the judgment whether or not the luminance value of the representative color of the selected region is equal to or less than a predetermined threshold value. Since to achieve this processing, it is only necessary to replace the processing in the step S47 in FIG. 13 by the processing that performs a judgment whether or not the luminance value of the representative color of the region is equal to or less than a predetermined threshold value, a figure that illustrates this process is omitted. Further, since the predetermined threshold value of luminance value is similar to that in the second embodiment, explanation thereof is omitted here. Note that for the luminance of the representative color, the CIE XYZ color space is transformed to L*a*b* color space and L* is treated as luminance data. Alternatively, it would acceptable to determine the range of Y in the CIE XYZ color space from the range of L* that is experimentally determined and treat Y as luminance data.

In addition, similarly to the third embodiment, it would also be acceptable to decide whether a detailed chromatic adaptation transformation or a simple chromatic adaptation transformation is to be applied by performing a judgment of whether or not the representative color of the selected region is within a predetermined range of the hue. Since to achieve this processing, it is only necessary to replace the processing in the step S47 in FIG. 13 by the processing that performs a judgment whether or not the representative color of the region is within a predetermined range of the hue, a figure that illustrates this process is omitted. Further, since the predetermined threshold value of the predetermined range of the hue is similar to that in the third embodiment, explanation thereof is omitted here.

Figure 14:
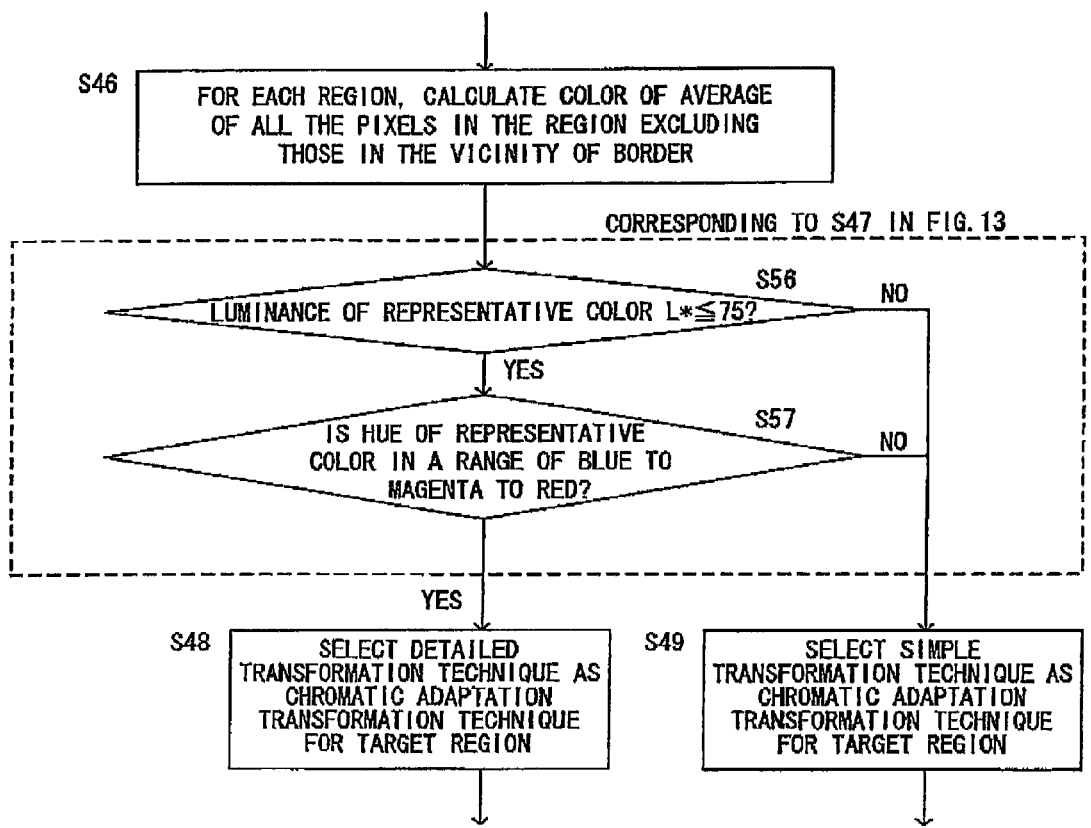
FIG. 14 is a diagram illustrating an example of processing in which a judgment according to a luminance value and a judgment according to hue are combined.

Further, it would also be acceptable to perform a judgment by adopting a combination of the judgment according to a luminance value and the judgment according to a hue. FIG. 14 is a diagram illustrating an example of the processing when the judgment according to a luminance value and the judgment according to a hue are used in combination. The step S47 in FIG. 13 is replaced by the processing in the step S56 and the step S57 in FIG. 14. The other steps are the same as in the steps in FIG. 13.

In FIG. 14, the flow of control proceeds from the step S46 to a step S56. In the step S56, it is judged whether the luminance value L* of the representative color is equal to or less than a predetermined threshold value (in the case of FIG. 14, threshold value=75). If the luminance vale L* is equal to or less than the predetermined threshold value, the flow of control proceeds to a step S57 to further perform a judgment of the hue. If the luminance vale L* is more than the predetermined threshold value, the flow of control proceeds to the step S49. In the step S57, it is judged whether or not the hue of the representative color is within a predetermined range of the hue (in the case of FIG. 14, in the range of blue to magenta to red). If the hue of the representative color is within the predetermined range of the hue, the flow of control proceeds to a step S48 whereas if the hue of the representative color is outside the predetermined range of the hue, the flow of control proceeds to the step S49.

That is, if the luminance value of the representative color is equal to or less than the predetermined threshold value and the hue of the representative color is within the predetermined range of the hue, a detailed chromatic adaptation transformation is performed and otherwise, a simple chromatic adaptation transformation is performed. This is because if only one of the conditions that the luminance value of the representative color is more than the predetermined threshold value and that the hue of the representative color is outside the predetermined range of the hue is satisfied, then there will be no serious adverse influences on the color appearance without performing prediction using a detailed color appearance model.

Fifth Embodiment

In the fourth embodiment above, explanation has been made on the method in which instead of selecting a chromatic adaptation transformation technique pixel by pixel, a plurality of neighboring pixels are treated as one region in image data to divide the image data into a plurality of regions and selection is made as to which transformation technique is to be applied region by region. In this case, explanation has been made on the example in which a representative color in the region is decided before the processing can be performed. In a fifth embodiment of the present invention, another method of selection in the case the transformation technique is selected region by region is explained. Since the construction of the image processing device in the fifth embodiment is the same as that in the first embodiment, reference is made to FIG. 1 for details and description thereof will be omitted here.

Figure 15:
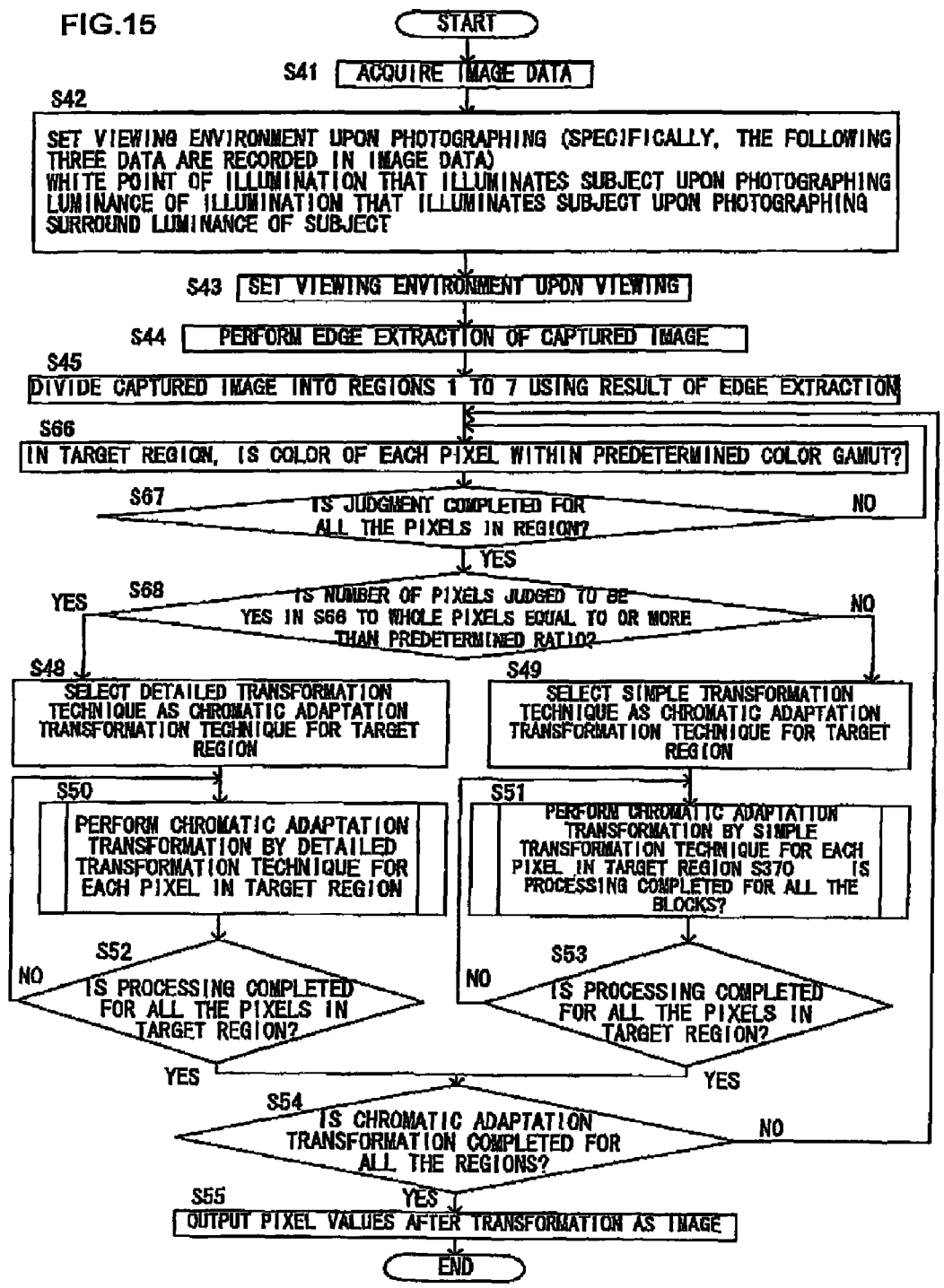
FIG. 15 is a flowchart illustrating processing in a fifth embodiment of the present invention.

FIG. 15 is a flowchart illustrating the processing to be executed by the personal computer 1 in the fifth embodiment. Steps having the same contents as those in the processing in FIG. 13 in the fourth embodiment are assigned the same step numbers and explanation thereof is omitted. In concrete terms, only the difference there between is that instead of the steps S46 and S47 in FIG. 13, steps S66 to step S68 are provided in FIG. 15. Hereinafter, explanation is made on the steps S66 to S68.

In the step S66, it is judged whether or not, in the selected region, the color of each pixel is within a predetermined color gamut, and the pixels in the predetermined color gamut are counted. In the step S67, it is judged whether or not, in the selected region, the judgment is completed for all the pixels. If the judgment is not completed, the flow of control returns to the step S66 to repeat the processing whereas if the judgment is completed, the flow of control proceeds to the step S68.

In the step S68, it is judged whether or not, in the transformation target region, a ratio of the number of pixels in the predetermined color gamut to the number of all the pixels in the transformation target region is equal to or more than a predetermined ratio. If the ratio is equal to or more than the predetermined ratio, the flow of the control proceeds to the step S48 to perform a detailed chromatic adaptation transformation. If the ratio is less than the predetermined ratio, the flow of control proceeds to the step S49 to perform a simple chromatic adaptation transformation.

Here, it is not always necessary to judge whether or not all the pixels in the transformation target region are within the predetermined color gamut. It would also be acceptable to perform the processing such that the counting pixels that are within a predetermined color gamut is continued and immediately when the counted value reaches or exceeds a predetermined ratio, the flow of control is switched to proceed to the step S48. Alternatively, it would be acceptable to perform the processing such that the counting of pixels is continued for both the case in which pixels are present within the predetermined color gamut and the case in which pixels are not present within the predetermined color gamut, and when the count in either one of the cases reaches a value corresponding to the ratio that is equal to or above a predetermined ratio, then at this time in point the flow of control is switched to proceed to one of the steps which corresponds to the one in which the ratio becomes equal to or exceeds the predetermined ratio.

In this manner, it is possible to select the same transformation technique for pixels in the same region. This, similarly to the fourth embodiment, prevents occurrence of unnaturalness in the decided region, such as conspicuousness of the boundary, due to a difference between the transformation techniques to be applied.

Note that, in the above, explanation has been made on the example in which in the step S66, it is judged whether or not the color of each pixel in the selected region is within a predetermined color gamut, and pixels in the predetermined color gamut are counted. However, similarly to the second embodiment, it would also be acceptable to perform a judgment whether or not the luminance value of each pixel in the selected region is equal to or less than a predetermined threshold value. Since to achieve this processing, it is only necessary to replace the processing in the step S66 in FIG. 15 by the processing that performs a judgment as to whether or not the luminance value of each pixel is equal to or less than a predetermined threshold value and counts the pixels having luminances that are equal to or less than the predetermined threshold value, a figure that illustrates this process is omitted. Further, since the predetermined threshold value of luminance value is similar to that in the second embodiment, explanation thereof is omitted here. Note that for the luminance of the representative color, the CIE XYZ color space is transformed to the L*a*b* color space and L* is treated as luminance data. Alternatively, it would acceptable to determine the range of Y in the CIE XYZ color space from the range of L* that is experimentally determined and treat Y as luminance data.

In addition, similarly to the third embodiment, it would also be acceptable to judge whether or not the color of each pixel in the selected region is within a predetermined range of the hue. Since to achieve this processing, it is only necessary to replace the processing in the step S66 in FIG. 15 by the processing that performs a judgment whether or not the color of each pixel in the selected region is within a predetermined range of the hue and counts the pixels in the predetermined range of hue, a figure that illustrates this process is omitted. Further, since the predetermined range of the hue is similar to that in the third embodiment, explanation thereof is omitted here.

As explained in FIG. 14 in the fourth embodiment, it would also be acceptable to perform a judgment using the judgment according to a luminance value and the judgment according to hue in combination.

Sixth Embodiment

In the first to fifth embodiments, explanation has been made on the examples in which image data of an image captured under an image-capturing condition are transformed into image data that reproduce a color appearance under a viewing condition that is different in an illumination condition from the image-capturing condition. In a sixth embodiment of the present invention, explanation is made on an example in which image data of a captured image are not used as an input image but image data prepared presupposing that the image data are viewed under a certain viewing condition are used as an input image. Note that since the construction of the image processing device in the sixth embodiment is the same as that in the first embodiment, reference is made to FIG. 1 for details and description thereof will be omitted here.

Figure 17:
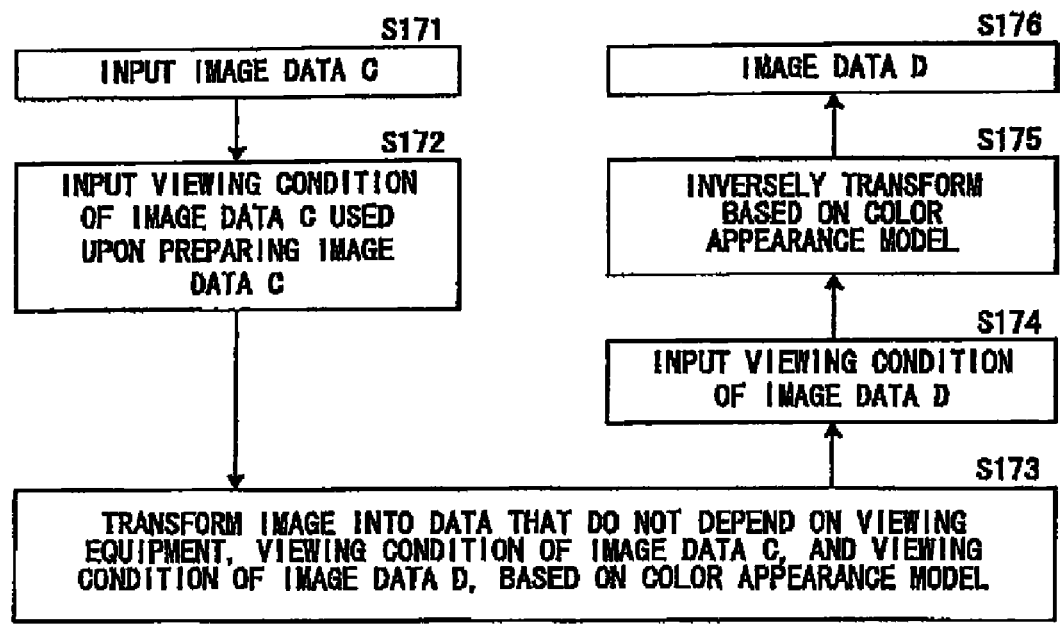
FIG. 17 is a diagram illustrating a basic flow of processing in a sixth embodiment of the present invention.

The personal computer 1 in the present embodiment transforms image data prepared based on a first viewing condition into image data that reproduce a color appearance corresponding to a second viewing condition that is different in an illumination condition from the first viewing condition taking into consideration chromatic adaptation properties of human vision. FIG. 17 is a diagram illustrating a basic flow of the processing executed by the personal computer 1.

In a step S171, image data C prepared presupposing a certain viewing condition by, for example, a digital camera or a personal computer are acquired. The image data C may be an image prepared by the processing that is equivalent to the transformation processing explained in the first to fifth embodiments described above (FIGS. 5, 7, 9, 13, and 15) or an image prepared by a single chromatic adaptation transformation for the whole image unlike the transformation processing explained in the first to fifth embodiments described above. In the present embodiment, the image data C are supposed to be expressed according to the CIE 1931 XYZ color system.

In a step S172, the viewing condition used at the time when the image data C were prepared is input as a first viewing condition. The first viewing condition may be data attached to the image data C or may be input as appropriate from a keyboard of the personal computer 1.

In a step S173, using a predetermined color appearance model, the image data C are transformed to data with a color appearance that depends neither on the first viewing condition nor on the viewing condition (second viewing condition) of an output image (image data D). On this occasion, the first viewing condition input in the step S172 is used as an input parameter of the color appearance model in the step S173. The data obtained by transformation are expressed as color appearance data that do not depend on the viewing equipments, the viewing condition of image data C or the viewing condition of image data D.

Since a step S174 is the same as the step S4 shown in FIG. 2 in the first embodiment, explanation thereof is omitted.

In a step S175, the same color appearance model as in the step S173 is applied to the data with a color appearance, which depend on none of the viewing equipments and the viewing conditions of the image data C and the image data D, obtained in the step S173. However, a transformation reverse to that in the step S173 is performed. On this occasion, the viewing conditions input in the step S174 are used as input parameters for the color appearance data in the step S175. Then, in a step S176, image data D which reproduce a color appearance depending on the viewing conditions of the image data D are acquired. The image data D are image data expressed according to the CIE 1931 XYZ color system.

The above-mentioned first viewing conditions are conditions relating to an equipment used for viewing the image data C and an illumination for surrounding viewing environment used upon preparing image data C. The second viewing conditions are conditions relating to an equipment used for viewing the image data D and an illumination for surrounding viewing environment. The first viewing conditions and the second viewing conditions are those conditions that relate to an environment of the visual field and its surround that affects color appearance, such as a luminance and a white point of an source of illumination, a surrounding brightness, and so on, that is, a viewing environment.

The present invention is featured by the color appearance model applied in the steps S173 and S175. That is, the color appearance model of CIECAM02 is applied to, among the image data C, only those data that satisfy predetermined conditions while a simple color appearance model whose load is lighter than CIECAM02 is applied to those data that do not satisfy the predetermined conditions.

FIG. 18 is a flowchart illustrating the processing to be executed by the personal computer 1 in the sixth embodiment.

In a step S111, the first image data that are prepared presupposing that they are viewed under the first viewing condition are acquired. In a step S112, the first viewing conditions are read in from the acquired image data and set as the first viewing condition. If the image data do not contain the data relating to the first viewing condition, an sRGB standard viewing environment is set as the first viewing condition.

In a step S113, an actual viewing environment upon viewing an image is read in and set as the second viewing condition. When viewing is performed on a monitor, an sRGB environment, which is a standard viewing environment, is read in or values input by the operation of the keyboard by a user (viewer) are used as a viewing environment for viewing.

In a step S114, it is judged whether or not the first viewing condition is equivalent to the second viewing condition. If these are equivalent, the flow of control proceeds to a step S122 and the input image is output as it is without any further processing. On the other hand, if the result of the judgment in the step S114 is NO, the flow of control proceeds to a step S115. Since the processing in steps S115 to S121 are similar to the steps S14 to S20 shown in FIG. 5 in the first embodiment, explanation thereof is omitted here. Note that in FIGS. 10 and 11 showing the processing in the steps S17 and S18, the viewing environment for image-capturing is replaced by the first viewing condition, and the viewing environment for viewing is replaced by the second viewing environment.

Note that in the above, explanation has been made on the example in which in the step S114, it is judged whether or not the color of the transformation target is in a predetermined color gamut. However, similarly to the second embodiment, it would also be acceptable to decide whether a detailed chromatic adaptation transformation or a simple chromatic adaptation transformation is to be performed by performing a judgment whether or not the luminance value of the transformation target pixel is equal to or less than a predetermined threshold value. Since to achieve this processing, it is only necessary to replace the processing in the step S115 in FIG. 18 by the processing that performs a judgment whether or not the luminance value of the transformation target pixel is equal to or less than a predetermined threshold value, a figure that illustrates this process is omitted. Further, since the predetermined threshold value of luminance value is similar to that in the second embodiment, explanation thereof is omitted here. Note that for the luminance, the CIE XYZ color space is transformed to the L*a*b* color space and L* is treated as luminance data. Alternatively, it would acceptable to determine the range of Y in the CIE XYZ color space from the range of L* that is experimentally determined and treat Y as luminance data.

In addition, similarly to the third embodiment, it would also be acceptable to judge whether or not the color of the transformation target pixel is within a predetermined range of the hue. Since to achieve this processing, it is only necessary to replace the processing in the step S115 in FIG. 18 by the processing that performs a judgment whether or not the transformation target pixel is within a predetermined range of the hue, a figure that illustrates this process is omitted. Further, since the predetermined threshold value of the predetermined range of the hue is similar to that in the third embodiment, explanation thereof is omitted here.

As explained in FIG. 14 in the fourth embodiment, it would be also acceptable to perform a judgment using the judgment according to a luminance value and the judgment according to hue in combination.

Similarly to the fourth and fifth embodiments, it would be acceptable to treat a plurality of neighboring pixels as one region and select which one of the transformation techniques is to be applied region by region. FIG. 19 is a flowchart illustrating the processing performed by deciding a representative color in the region similarly to the fourth embodiment. The steps S141 to S144 are similar to the steps S111 to 114 in FIG. 18 and hence explanation thereof is omitted. If the result of the judgment in the step S144 is judged to be YES, the flow of control proceeds to a step S157. The step S157 is similar to the step S122 in FIG. 18. If the result of the judgment in the step S144 is judged to be NO, the flow of control proceeds to a step S145. The processing in the steps S145 to S156 is the same as the processing in the steps S44 to S55 in FIG. 13 in the fourth embodiment and hence explanation thereof is omitted.

FIG. 20 is a flowchart illustrating the processing performed by using a ratio of a pixel in a predetermined color gamut similarly to the fifth embodiment. The steps S141 to S144 are similar to the steps S111 to 114 in FIG. 18 and hence explanation there of is omitted. If the result of the judgment in the step S144 is judged to be YES, the flow of control proceeds to a step S157. The step S157 is similar to the step S122 in FIG. 18. If the result of the judgment in the step S144 is judged to be NO, the flow of control proceeds to a step S145. Each processing in the steps S145, S146, S167 to S169, and S149 to S156 is the same as each processing in the steps S44, S45, S66 to S68, and S48 to S55 in FIG. 15 in the fifth embodiment and hence explanation thereof is omitted.

Also, similarly to the fourth and fifth embodiments, in the case where a plurality of neighboring pixels are treated as one region in image data to divide the image data into a plurality of regions and it is selected as to which one of the transformation techniques is to be applied region by region, the selection of transformation technique may be performed, similarly to the second embodiment, by the processing that performs a judgment as to whether or not a luminance value of each pixel in a target region or of a representative color in the region is equal to or less than a predetermined threshold value and using the result of the judgment. To achieve this processing, it is only necessary to replace the processing in the step S148 in FIG. 19 by the processing that performs a judgment as to whether or not the luminance of the representative color is equal to or less than a predetermined threshold value, and to replace the processing in the step S167 in FIG. 20 by the processing that performs a judgment as to whether or not a luminance value of each pixel in a transformation target region or of a representative color in the region is equal to or less than a predetermined threshold value and counts the pixels having a luminance value equal to or less than the predetermined threshold value. Also, similarly to the third embodiment, it would be acceptable to judge whether or not the hue of each pixel in a transformation target pixel or of a representative color in the region is within a predetermined range of the hue and use the result of the judgment. To achieve this processing, it is only necessary to replace the processing in the step S167 in FIG. 20 by the processing that performs a judgment as to whether or not a luminance value of each pixel in a transformation target region or of a representative color in the region is equal to or less than a predetermined threshold value and counts the pixels having a luminance value equal to or less than the predetermined threshold value.

As explained in FIG. 14 in the fourth embodiment, it would also be acceptable to perform a judgment using the judgment according to a luminance value and the judgment according to a hue in combination.

Variation Example 1

In the first to sixth embodiments described above, explanation has been made on choice between only two color appearance models, i.e., a detailed color appearance model or a simplified color appearance model. However, a plurality of simplified models configured by combining a plurality of conditions as shown in the first to sixth embodiments may be used selectively depending on the situation.

Variation Example 2

In the first to sixth embodiments described above, the simplified color appearance model used therein is a color appearance model according to the von Kries chromatic adaptation formula. However, the simplified color appearance model may be one obtained by omitting a part of calculations in CIECAM02. For example, the simplified color appearance model may be one obtained by omitting a part of the steps out of the 13 steps in the forward transformation and the steps of its inverse transformation.

Variation Example 3

In the first embodiment described above, the background luminance Yb is defined as a luminance of stimulus values in a visual field of 10 degrees peripheral around a visual field of 2 degrees. When deciding this background luminance, if a background luminance is obtained from peripheral pixels falling in a visual field of 10 degrees for each pixel, a lot of processing time is required. Accordingly, in the present variation example, a color appearance experiment similar to that explained in the first embodiment is conducted to extract colors that are sensitive to a change in a background luminance to obtain a color gamut and store the obtained data in advance.

If the color of a pixel falls in this color gamut, an accurate prediction of a color appearance can be obtained by exactly calculating a background luminance pixel by pixel and applying the result to a color appearance model. However, in other cases, if a background luminance of a fixed value that has been determined in advance is applied, there will be not a significant influence on the color appearance. It is conceivable to use, for example, an average luminance of the whole image as the background luminance fixed in advance. Generally, in most cases, the average luminance of an image is about 20% (based on 18% gray) and hence, in a simplified transformation method, for example, 20% is adopted as a fixed value of the background luminance. That is, assuming Yw=100, then it is set to Yb=20.

Therefore, in the present variation example, the same color appearance model CIECAM02 is used in both the detailed color appearance model in the step S17 and the simplified color appearance model in the step S18 in the flowchart illustrated in FIG. 5 according to the first embodiment. Then, as the simplified color appearance model in the step S18, there is used a CIECAM02 color appearance model of which the background luminance has been set to a fixed value in advance. That is, if the color of a target pixel falls in the above-mentioned predetermined color gamut, the background luminance of each pixel is exactly calculated and the resultant is assigned to the parameter of CIECAM02 to predict the color appearance. If the color of the target pixel is outside the predetermined color gamut, the background luminance determined in advance is assigned to the parameter of CIECAM02 to predict the color appearance.

In this manner, it is unnecessary to calculate a background luminance for each pixel, so that the processing time becomes shorter and the color appearance can be accurately predicted.

Variation Example 4

In the flowchart shown in FIG. 7 according to the second embodiment, it would also be acceptable to adopt, as the simplified color appearance model in the step S18, the color appearance model according to CIECAM02 of which the background luminance is set to a fixed value determined in advance as in Variation Example 3.

In this case, a range of luminance in which a change in the background luminance leads to a considerable influence on the color appearance is determined in advance by an experiment such as one explained in the second embodiment. For example, it is assumed that the range of luminance in which a change in background luminance leads to a considerable influence on the color appearance is determined such that $L^* \leq 80$ in CIE $L^*a^*b^*$ in a color patch before transformation. For pixels of $L^* \leq 80$, an accurate color appearance cannot be reproduced unless a background luminance is exactly calculated for each pixel and the result is applied to the color appearance model whereas for pixels of $L^* > 80$, no substantial influence on the color appearance is observed if there is applied a background luminance having a fixed value that has been determined in advance regardless of the pixels.

In the step S21 in the flowchart illustrated in FIG. 7, it is judged whether or not the luminance of a target pixel is within the predetermined range obtained by the above-mentioned experiment (L*≦80 in CIE L*a*b*). Then, if the luminance is within the predetermined range, a background luminance is exactly calculated for each pixel and the result is assigned to the parameter of CIECAM02 to predict a color appearance. If the luminance is outside the predetermined range, a background luminance having the above-mentioned fixed value is assigned to the parameter of CIECAM02 to predict a color appearance. Note that for the luminance, although explanation has been made on the example in which the CIE XYZ color space is transformed to the L*a*b* color space and L* is treated as luminance data, it would also be acceptable to determine the range of Y in the CIE XYZ color space from the range of L* that is experimentally determined and treat Y as luminance data.

In this manner, it is unnecessary to calculate a background luminance for each pixel, so that the processing time becomes shorter and the color appearance can be accurately predicted.

Variation Example 5

In the flowchart shown in FIG. 9 according to the third embodiment, it would also be acceptable to adopt, as the simplified color appearance model in the step S18, the color appearance model according to CIECAM02 of which the background luminance is set to a fixed value determined in advance as in Variation Example 3.

In this case, a range of the hue in which a change in a background luminance leads to a considerable influence on the color appearance is determined in advance by an experiment. For example, it is assumed that the range of hue in which a change in background luminance leads to a considerable influence on the color appearance is determined such that $a^* \geq 0$ or in a range of $a^* < 0$ and $b^* < 0$ in CIE L*a*b*. For pixels of $a^* \geq 0$ or in a range of $a^* < 0$ and $b^* < 0$, an accurate color appearance can be reproduced if the background luminance is exactly calculated for each pixel and the result is applied to the color appearance model whereas for pixels $a^* < 0$ and $b^* \geq 0$, no substantial influence on the color appearance is observed if there is applied a background luminance having a fixed value that has been determined in advance regardless of the pixels.

In the step S31 in the flowchart shown in FIG. 9, it is judged whether or not the color of a target region is within the predetermined range of the hue obtained by the above-mentioned experiment ($a^* \geq 0$ or in a range of $a^* < 0$ and $b^* < 0$ in CIE L*a*b* space). Then, if the hue is within the predetermined range of the hue, a background luminance is exactly calculated for each pixel and the result is assigned to the parameter of CIECAM02 to predict a color appearance. If the hue is outside the predetermined range, a background luminance having the above-mentioned fixed value is assigned to the parameter of CIECAM02 to predict a color appearance. Note that for hues, the CIE XYZ color space is transformed to the CIE L*a*b* color space, and data of a* and b* are used as described above or data of a hue angle of $h = \tan^{-1}(b^*/a^*)$ are used for the judgment.

In this manner, it is unnecessary to calculate a background luminance for each pixel, so that the processing time becomes shorter and the color appearance can be accurately predicted.

Other Variation Examples

In the flowchart illustrated in FIG. 13 according to the fourth embodiment and the flowchart illustrated in FIG. 15 according to the fifth embodiment, the simplified color appearance model in the step S51 may be a color appearance model according to CIECAM02 of which a background luminance is set to a fixed value that has been determined in advance as described in Variation Example 3.

Further, in the flowchart illustrated in FIG. 18 according to the sixth embodiment, the simplified color appearance model in the step S119 may be a color appearance model according to CIECAM02 of which the background luminance is set to a fixed value that has been determined in advance as described in Variation Example 3. In addition, in the flowcharts illustrated in FIGS. 19 and 20, the simplified color appearance model in the step S152 may be a color appearance model according to CIECAM02 of which a background luminance is set to a fixed value that has been determined in advance as described in Variation Example 3.

In the above embodiments, explanation has been made on examples in which CIECAM02 is adopted as the detailed color appearance model. However, other color appearance models may also be used. For example, CIECAM97s, an old model for CIECAM02, Fairchild model, or other models may be used. On the other hand, explanation has been made on the example in which von Kries adaptation transformation formula is adopted as the simple color appearance model. However, a transformation method using another simple technique may be adopted. That is, whatsoever a technique may be used as far as a detailed technique and a simple technique can be used selectively depending on the state of the transformation target pixel In the above embodiment, although explanation has been made on the example in which both transformation target image data and image data after transformation are expressed according to the CIE 1931 XYZ color system, the present invention should not be limited to this content and other color system may be used.

In the first embodiment described above, explanation has been made on the example in which the chromatic adaptation transformation technique is selected depending on whether or not the color of a transformation target pixel is within a predetermined color gamut. In the second embodiment, explanation has been made on the example in which the chromatic adaptation transformation technique is selected depending on whether or not the luminance of a transformation target pixel is equal to or less than a predetermined threshold value. In the third embodiment, explanation has been made on the example in which the chromatic adaptation transformation technique is selected depending on whether or not the color of a transformation target pixel is within a predetermined range of the hue. Further, the chromatic adaptation transformation technique may be selected depending on whether or not the color of a transformation target pixel is within a predetermined range of the saturation. Also, as in the fourth and fifth embodiments, when an image is divided into regions and a transformation technique is selected region by region, it would be acceptable to select a chromatic adaptation transformation technique depending on whether or not the representative color of the transformation target region or the color of each pixel in the transformation target region is within a predetermined range of the saturation. Also, as in the sixth embodiment, in case of using an image prepared assuming that it is viewed under a first viewing condition as an input image, and transforming the input image to achieve a color appearance of the input image when being viewed under a second viewing condition being an actual viewing condition, it would be acceptable to allow a chromatic adaptation transformation technique to be selected based on whether or not the color of a transformation target pixel used for the selection of the chromatic adaptation transformation technique, the representative color of the transformation target region, or the color of each pixel in the transformation target region is within a predetermined range of the saturation. For saturations, the CIE XYZ color space is transformed into the CIE L*a*b* color space and judged by the magnitude of a value of saturation $C=\sqrt{(a^{*2}+b^{*2})}$.

In the present embodiment, the term "color gamut" refers to an agglomerate of or a range of colors that satisfy some conditions. Parameters that represent a color include a luminance, a hue, and a saturation. Therefore, a range identified by any one of the parameters, i.e., a luminance, a hue, and a saturation or parameters of any combinations thereof shall determine some color gamut. That is, a range identified by a luminance only, a range identified by a hue only, and a range identified by a saturation only, as well as ranges of any combinations thereof all can be said to be color gamuts as termed in the present embodiment. In addition, ranges of colors identified by the XYZ color system, the RGB color system, the L*a*b* color system, and so on identify a color gamut. In these color systems, not only those ranges that are identified by three components (coordinates) but also those ranges that are identified by only one component (coordinate) or those ranges that are identified by any two components (coordinates) identify a color gamut.

In the above-mentioned embodiments, explanation has been made on the examples in which image data acquired by a digital camera or the like are processed by the personal computer 1. However, the present invention should not be construed as being limited to this content. Instead, it would also be acceptable to perform all the above processing in the camera. In this case, the program explained above is installed in a memory arranged in the camera and the CPU in the camera executes the program.

Figure 16:
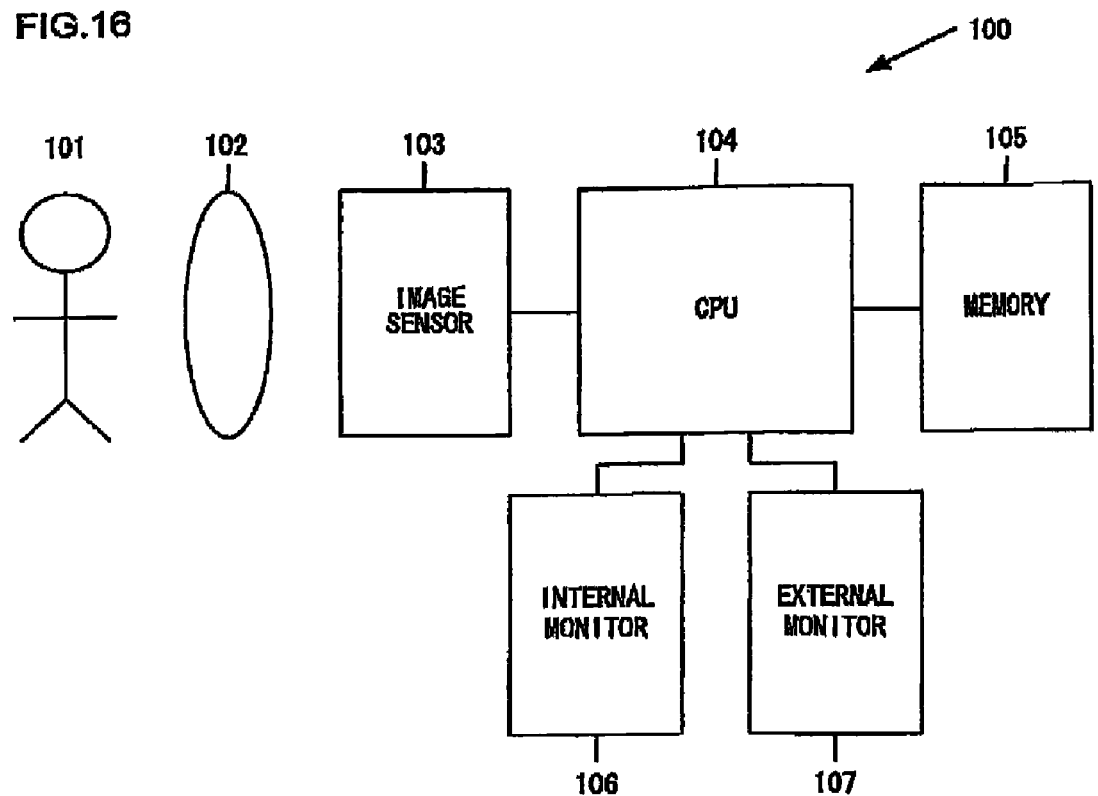
FIG. 16 is a diagram showing a configuration of a digital camera 100.

FIG. 16 is a diagram showing a construction of a digital camera (electronic camera) 100 when a transformation is performed in the camera. An image sensor 103 such as a CCD captures an image of a subject 101 through a photographic lens 102. A controlling device 104 generates image data based on output signals from the image sensor 103, performing predetermined processing on the image data, and stores the processed image data in a memory 105 such as a memory card. The controlling device 104 reads out the image data stored in the memory 105 to display an image corresponding to the read-out image data on an internal monitor 106 provided in the digital camera 100 or on an external monitor 107 connected to the digital camera 100 through a cable. On this occasion, the controlling device 104 displays the image on the external monitor 106 or the external monitor 107 while it performs processing equivalent to the transformation processing explained in the above-mentioned embodiments (FIGS. 5, 7, 9, 13, and 15). As the image-capturing condition, use is made of data acquired upon the image-capturing and stored in the memory 105 as a part of the image data. The viewing condition, when displayed on the internal monitor 106, use is made of device properties (white point or luminance) of the internal monitor 106 set in advance. On the other hand, when being displayed on the external monitor 107, an sRGB standard viewing environment is used. Also, it would be acceptable to allow a user (viewer) to input the condition selectively depending on whether the internal monitor 106 or the external monitor 107 is used using a menu screen of the digital camera 100.

Note that when image data are stored in the memory 105 in a general-purpose file format such as JPEG, processing equivalent to the transformation processing explained in the above-mentioned first to fifth embodiments (FIGS. 5, 7, 9, 13, and 15) using image-capturing condition data acquired upon image-capturing as the image-capturing condition and the sRGB standard viewing environment as the viewing condition. The image having undergone the processing may be stored. In this case, a flag indicating that the transformation processing is completed is attached to the image data and the conditions used in the transformation processing are also appended to the image data.

When such processed image data are output to an image outputting device (a monitor or a printer) connected to the personal computer or the digital camera 100 and the output image is viewed, processing equivalent to the transformation processing explained in the sixth embodiment (FIGS. 18, 19, and 20) is performed in the inside of the personal computer or digital camera 100 before the image can be output. On this occasion, as the image-capturing condition, the viewing condition used in the transformation processing is used. Note that as the viewing condition, an actual viewing condition is selectively input by a user (viewer) through a keyboard connected to a personal computer or a menu screen of the digital camera 100.

In the above, various embodiments and variation examples have been explained. However, the present invention should not be construed as being limited to the contents thereof but other illustrative embodiments that are conceivable within the technical concept of the present invention are encompassed by scope of the present invention.

The disclosure of the following basic application on which the present application claims priority is herein incorporated by reference:

Japanese Patent Application No. 2005-202823 filed Jul. 12, 2005.

The invention claimed is:

1. An image processing device that transforms first image data of an image captured under an image-capturing condition into second image data that reproduce a color appearance under a viewing condition, comprising:

an image data acquiring unit that acquires the first image data of the image captured under the image-capturing condition;

a first transformation unit that transforms the acquired first image data into the second image data pixel by pixel based on the image-capturing condition and the viewing condition by a first method that takes into consideration chromatic adaptation;

a second transformation unit that transforms the acquired first image data into the second image data pixel by pixel based on the image-capturing condition and the viewing condition by a second method that is simpler than the first method and takes into consideration chromatic adaptation; and a controlling unit that controls such that either the first transformation unit or the second transformation unit is selected depending on a state of a transformation target pixel or a neighborhood pixel neighboring the transformation target pixel in the first image data, wherein the controlling unit controls such that when a color of the transformation target pixel in the first image data is within a predetermined color gamut, the first transformation unit is selected, and when the color of the transformation target pixel in the first image data is not within the predetermined color gamut, the second color transformation unit is selected, and the predetermined color gamut includes a predetermined range of luminance or a predetermined range of hue.

2. An image processing device according to claim 1, further comprising:
a color gamut defining unit that in case that many persons select a specified color different from an original color as a corresponding color achieving a corresponding color appearance with the original color under an influence of at least one of a background luminance surrounding a transformation target pixel in the image and a difference between the image-capturing condition and the viewing condition, defines a group of such original colors as the predetermined color gamut, wherein:
the controlling unit referring to the color gamut defining unit, judges whether or not a color of a transformation target pixel in the first image data is within the predetermined color gamut.

3. An image processing device according to claim 1, wherein:
the controlling unit controls such that the first image data are divided into a plurality of regions and any one of the first transformation unit and the second unit is selected region by region depending on a state of pixels included in each divided region so that the same transformation unit is selected for each pixel in the same region.

4. An image processing device according to claim 3, wherein:
the controlling unit controls such that when for pixels included in a transformation target region in the first image data, a ratio of a number of pixels whose color is in the predetermined color gamut to a number of all the pixels is equal to or more than a predetermined ratio, the first transformation unit is selected, and when the ratio of the number of pixels whose color is in the predetermined color gamut to the number of all the pixels is less than the predetermined ratio, the second transformation unit is selected.

5. An image processing device according to claim 4, further comprising:
a color gamut defining unit that in case that many persons select a specified color different from an original color as a corresponding color achieving a corresponding color appearance with the original color under an influence of at least one of a background luminance surrounding a transformation target pixel in the image and a difference between the image-capturing condition and the viewing condition, defines a group of such original colors as the predetermined color gamut, wherein:
the controlling unit, referring to the color gamut defining unit, judges whether or not a color of each pixel included in a transformation target region in the first image data is within the predetermined color gamut.

6. An image processing device according to claim 3, wherein:
the controlling unit controls such that when a color representing a transformation target region in the first image data is within the predetermined color gamut, the first transformation unit is selected, and when the color representing the transformation target region in the first image data is not within the predetermined color gamut, the second color transformation unit is selected.

7. An image processing device according to claim 6, further comprising:
a color gamut defining unit that in case that many persons select a specified color different from an original color as a corresponding color achieving a corresponding color appearance with the original color under an influence of at least one of a background luminance surrounding a transformation target pixel in the image and a difference between the image-capturing condition and the viewing condition, defines a group of such original colors as the predetermined color gamut, wherein:
the controlling unit, referring to the color gamut defining unit, judges whether or not the color representing the transformation target region in the first image data is within the predetermined color gamut.

8. An image processing device according to claim 6, wherein:
the color representing the trans formation target region is a color obtained by averaging colors of all or a predetermined number or more of pixels included in the transformation target region.

9. An image processing device according to claim 1, wherein:
both the first method and the second method are methods based on the same color appearance model, and the second method is obtained by omitting a predetermined calculation from the color appearance model.

10. An image processing device according to claim 9, wherein:
the first method and the second method are each a method using a color appearance model according to CIECAM02.

11. An image processing device according to claim 1, wherein:
the second method is a method that involves only four basic operations of arithmetic.

12. An image processing device according to claim 1, wherein:
both the first method and the second method are methods that perform a transformation taking into consideration a background luminance of the transformation target pixel;
the first method calculates the background luminance of the transformation target pixel based on a luminance of a neighboring pixel; and
the second method sets the background luminance of the transformation target pixel to a predetermined fixed value.

13. An image processing device according to claim 1, wherein:
the first method is a method using a color appearance model according to CIECAM02 and the second method is a method using a von Kries adaptation transformation formula.

14. An image processing program that causes a computer to realize a function of the image processing device according to claim 1.

15. An image processing device that transforms first image data prepared based on a first viewing condition into second image data that reproduce a color appearance under a second viewing condition that is different from the first viewing condition, comprising:
an image data acquiring unit that acquires the first image data prepared based on the first viewing condition;
a first transformation unit that transforms the acquired first image data into the second image data pixel by pixel based on the first viewing condition and the second viewing condition by a first method that takes into consideration chromatic adaptation;
a second transformation unit that transforms the acquired first image data into the second image data pixel by pixel based on the viewing condition and the second viewing condition by a second method that is simpler than the first method and takes into consideration chromatic adaptation; and a controlling unit that controls such that either the first transformation unit or the second transformation unit is selected depending on a state of a transformation target pixel or a neighborhood pixel neighboring the transformation target pixel in the first image data, wherein the controlling unit controls such that when a color of transformation target pixel in the first image data is within a predetermined color gamut, the first transformation unit is selected, and when the color of the transformation target pixel in the first image data is not within the predetermined color gamut, the second color transformation unit is selected, and the predetermined color gamut includes a predetermined range of luminance or a predetermined range of hue.

16. An image processing method that transforms first image data of an image captured under an image-capturing condition into second image data that reproduce a color appearance under a viewing condition, comprising:

acquiring the first image data of the image captured under the image capturing condition; and when the acquired first image data are transformed into the second image data pixel by pixel based on the image-capturing condition and the viewing condition, using selectively either one of a first method that takes into consideration chromatic adaptation and a second method that takes into consideration chromatic adaptation simpler than the first method depending on a state of a transformation target pixel or a neighborhood pixel neighboring the transformation target pixel in the first image data, wherein the controlling unit controls such that when a color of the transformation target pixel in the first image data is within a predetermined color gamut, the first transformation unit is selected, and when the color of the transformation target pixel in the first image data is not within the predetermined color gamut, the second color transformation unit is selected, and the predetermined color gamut includes a predetermined range of luminance or a predetermined range of hue.

17. An image processing method according to claim 16, further comprising:

dividing the first image data into a plurality of regions, wherein when the acquired first image data are transformed into the second image data pixel by pixel based on the image-capturing condition and the viewing condition, either one of the first method that takes into consideration chromatic adaptation and the second method that takes into consideration chromatic adaptation simpler than the first method is used selectively region by region depending on a state of pixels included in each of the regions.

18. An image processing method that transforms first image data prepared based on a first viewing condition into second image data that reproduce a color appearance under a second viewing condition that is different from the first viewing condition, comprising:

acquiring the first image data of the image captured under the first viewing condition; and when the acquired first image data are transformed into the second image data pixel by pixel based on the first viewing condition and the second viewing condition, using selectively other one of a first method that takes into consideration chromatic adaptation and a second method that takes into consideration chromatic adaptation simpler than the first method depending on a state of a transformation target pixel or a neighborhood pixel neighboring the transformation target pixel in the first image data, wherein the controlling unit controls such that when a color of the transformation target pixel in the first image data is within a predetermined color gamut, the first transformation unit is selected, and when the color of the transformation target pixel in the first image data is not within the predetermined color gamut, the second color transformation unit is selected, and the predetermined color gamut includes a predetermined range of luminance or a predetermined range of hue.

* * * * *